US005557795A

United States Patent [19]
Venable

[11] Patent Number: 5,557,795
[45] Date of Patent: * Sep. 17, 1996

[54] PIPELINED IMAGE PROCESSING SYSTEM FOR A SINGLE APPLICATION ENVIRONMENT

[75] Inventor: Dennis L. Venable, Rochester, N.Y.

[73] Assignee: Xerox Corporation, Stamford, Conn.

[ * ] Notice: The term of this patent shall not extend beyond the expiration date of Pat. No. 5,396,616.

[21] Appl. No.: 76,678

[22] Filed: Jun. 15, 1993

[51] Int. Cl.$^6$ .................................................. G06F 9/455
[52] U.S. Cl. .................... 395/650; 395/700; 395/500; 395/183.06; 395/182.13; 364/231.8; 364/228; 364/DIG. 1; 364/232.8
[58] Field of Search ................................ 382/49; 358/94; 364/DIG. 1, DIG. 2; 395/650, 700

[56] References Cited

U.S. PATENT DOCUMENTS

| | | | |
|---|---|---|---|
| 4,493,019 | 1/1985 | Kim et al. | 364/200 |
| 4,541,114 | 9/1985 | Rutenbar et al. | 382/8 |
| 4,658,354 | 4/1987 | Nukiyama | 364/200 |
| 4,811,413 | 3/1989 | Kimmel | 382/41 |
| 4,845,663 | 7/1989 | Brown et al. | 364/900 |
| 4,949,390 | 8/1990 | Iverson et al. | 382/49 |
| 4,982,402 | 1/1991 | Beaven et al. | 371/12 |
| 5,007,100 | 4/1991 | D'Aoust et al. | 382/49 |
| 5,020,115 | 5/1991 | Black | 382/44 |
| 5,097,326 | 3/1992 | Meijer | 358/94 |
| 5,317,718 | 5/1994 | Jouppi | 395/425 |
| 5,371,860 | 12/1994 | Mura et al. | 395/325 |
| 5,396,616 | 3/1995 | Venable | 395/500 |

FOREIGN PATENT DOCUMENTS 357444  3/1990  European Pat. Off. .

OTHER PUBLICATIONS

McLauchlan P F 'HORATIO: libraries for vision applications', 15 Dec. 1992, UK, OUEL 1967/92; p. 56, para. 9—p. 63, para. 7 and 8.

Electronic Imaging '88: International Electronic Imaging Exposition and Conference. Advance Printing of Paper Summaries, Boston, MA, USA, 3–6 Oct. 1988, 1988, Waltham, MA, USA Inst. Graphic Commun, USA, pp. 915–917 vol. 2, Walsh P M et al 'Reconfigurable access library for pipeline architecture image processing workstations and target systems'—the whole document.

Journal of Parallel and Distributed Computing, vol. 2, No. 1, Feb. 1985 pp. 50–78, XP 000048281, Kent E W et al 'Pipe. (Pipeline Image–Processing Engine)'—the whole document.

Primary Examiner—Kevin A. Kriess
Assistant Examiner—Majid A. Banankhah
Attorney, Agent, or Firm—Oliff & Berridge

[57] ABSTRACT

A control system for pipelined image processing emulates a multi-tasking environment using a single tasking application. A number of predefined image processing tasks are provided in a library. When a host application needs a processed image from an image source, the host application creates a pipeline of initialized instantiations of one or more of the tasks from the library. When the host application invokes the pipeline, the first data request for the heater of the image travels upstream in a first channel. The processed image header is returned down the first channel. Then a data request for scanlines of image data is sent upstream in a second data channel. The data request ripples upstreamwardly to the upstream-most instantiation of one of the tasks from the task library. The upstream-most instantiation of a task obtains a scan line from an image data source and returns it downstreamwardly to the host application in the second channel. Each instantiation of a task from the task library further operates on the image data. Once all of the scanlines have been processed, the memory allocations and data structures created during initialization are released to free up that memory.

35 Claims, 18 Drawing Sheets

```
/*******************************************************************/
/**                                                               **/
/**                      EXAMPLE FUNCTION                         **/
/**                                                               **/
/*******************************************************************/
     /*Task data structures*/
1    typedef struct _task              /*general Task data structure*/
2      {
3        int (*channel1) ();           /*first channel procedure*/
4        int (*channel2) ();           /*second channel procedure*/
5        struct _task *blink;          /*backward link*/
6      } task;

7    typedef struct                    /*Math subclass data structure*/
8      {
9        Task task;                    /*inherit Task data structure*/
10       int aval;                     /*channel 1 addend*/
11       int mval;                     /*channel 2 multiplicand*/
12     } MathTask;

/*procedures */
13   Task *initMath Task();            /*task initialization function*/
14   static int do_add();              /*channel 1 procedure*/
15   static int do_mul();              /*channel 2 procedure*/

/*******************************************************************/
/**                                                               **/
/**       Create and initialize a Math task                       **/
/**                                                               **/
/*******************************************************************/

16   Task *
17   initMathTask(avalue, mvalue, link)
18   int avalue;                       /*channel 1 addend value*/
19   int mvalue;                       /*channel 2 multiplicand value*/
20   Task *link;                       /*backward link*/
       {
```

FIG.5A-1

```
        /*create the task data structure */
21      MathTask *mtask = (MathTask *)calloc(1,sizeof(MathTask));

/*initialize channel procedures */
22      mtask->task.channel1 = do_add;
23      mtask->task.channel2 = do_mul;

/*initialize backward link */
24      mtask->task.blink = link;

/*initialize state parameters*
25      mtask->aval = avalue;
26      mtask->mval = mvalue;

/*return task data structure */
27      return ((Task *)mtask);
        }
```

FIG.5A-2

```
     /****************************************************************/
     /**                                                            **/
     /** Channel 1 process procedure - add a value to the input     **/
     /**                                                            **/
     /****************************************************************/
28   static int
29   do_add(mtask)
30   MathTask *mtask;
31       {
32       int val = 0;

/*if a link is present, get input data by calling channel1 of link*/
33       if (mtask->task.blink)
34          val = (*mtask->task.blink->channel1)(mtask->task.blink);

/*process the data*/
35       val = val + mtask->aval;

/*return processed data*/
36       return (val);
37       }

/****************************************************************/
     /**                                                            **/
     /** Channel 2 process procedure - multiply input by a value    **/
     /**                                                            **/
     /****************************************************************/
38   static int
39   do_mul(mtask)
40   MathTask *mtask;
41       {
42       int val = 1;

/*if a link is present, get input data by calling channel2 of link*/
43       if (mtask->task.blink)
44          val = (*mtask->task.blink->channel2)(mtask->task.blink);
```

FIG.5B-1

```
       /*process the data */
45     val = val * mtask—mval;

/*return processed data */
46     return (val);
47     }

/*****************************************************************/
/**                                                             **/
/**        end of example code                                  **/
/**                                                             **/
/*****************************************************************/
```

FIG.5B-2

```
/*****************************************************************/
/**                                                             **/
/** Listing 2) Example application - initialize a  MathTask     **/
/**                                       pipeline and execute  **/
/*****************************************************************/ include <stdio.h>

1   main( argc,argv)
2   int argc;
3   char **argv;
4     {
5     int i,n,add_value,mul_value;
6     Task *task = NULL;

/*read the length of the pipeline from command arguments*/
7     n = atoi(argv[1]);

/*initialize each task of the pipeline*/
8     for (i=1; i<=n; ++i)
9         task = initMathTask(i,i,task);

/*execute the pipeline for both channel 1 and channel 2*/
10    add_value = (*task→channel1)(task);
11    mul_value = (*task→channel2)(task);
12    printf("   #tasks: %d, channel1: %d, channel2: %d",
13          n, add_val, mul_val);
14    }

/*****************************************************************/
/**                                                             **/
/**             End of example application                      **/
/**                                                             **/
/*****************************************************************/
```

FIG.6

Listing 3) Example Results:

tpou:213> rrl_example 5
    #tasks: 5, channel1: 15, channel2: 120

FIG.7

PIPELINED IMAGE PROCESSING SYSTEM FOR A SINGLE APPLICATION ENVIRONMENT

BACKGROUND OF THE INVENTION

1. Field of the Invention

This invention relates to processing an image, comprising an image header and image data, in a single-application environment, by emulating a multi-processing environment. In particular, this invention relates to an object-oriented system employing a library of predefined objects or data structures which can be linked between a host application and a data source to create a stream-oriented data processing structure emulating a UNIX®-like pipeline data structure.

2. Description of the Related Art

The use of data processing pipelines in true multi-processing environments is well known. Examples of known multi-processing environments include both multiple-processor systems and high level systems where a single processor is able to support true multi-processing. The UNIX® operating system is often used in such multi-processing systems.

In such multi-processing environments, data processing pipelines are extremely useful for processing large, highly structured data blocks, such as those associated with image processing, database processing, or spreadsheet processing. In such data blocks, various data processing operations must be performed on each data element of the data blocks. Further, the various data processing operations are performed in a specific order.

In a multi-processing environment, data processing pipelines provide a very efficient method for processing the data blocks. In these data processing pipelines, each separate data processing operation is defined as a section of the pipeline. Each section is linked to one or both of the sections (the upstream and downstream sections) to which it is adjacent. The data processing operation thus form a chain of linked pipeline sections between a data source and a host application. In a computer having a number of independent processors, each pipeline section corresponds to one of the processors. In this case, each processor works independently, and the computer operating system controls the flow of data between processors and the memory allocation. While this efficiently processes the data, the overhead necessary to control the processors and the memory consumes a significant proportion of the system resources.

Likewise, in a computer having a single processor which can simultaneously run a number of different independent processing operations, or processes, each pipeline section corresponds to one of the independently-running processes. In this case, the operating system allocates the run-time of each process, the flow of data between each process and memory and the memory allocation. The overhead necessary to control the computer in this case consumes an even larger proportion of the system resources, as each process and its data must be swapped into and out of the processor each time it is run. Additionally, since the processes communicate through the operating system, dynamically altering the pipeline is difficult, if not impossible.

In general, the source of data for the pipeline can be, for example: 1) a spreadsheet providing financial information; 2) the records within a data base file providing database information; and 3) image data generated by a conventional image scanner from an original document, a computer generated image, or the like. In contrast, the host application could be a graphics program for producing pie charts, bar charts or the like from processed financial data; an inventory, accounting, or merging program which uses processed database data; or an image forming apparatus for forming an image from the processed image data.

Regardless of the particular source of data or ultimate host application, the first, or upstream-most, section of the data processing pipeline is generally the data source for the pipeline. Alternately, the data source for this first pipeline can be a second pipeline. In this case, a special branching or "fan-out" pipeline section of the second pipeline can be used to supply data to both the first pipeline and the downstream sections of the second pipeline. In either case, the first pipeline section obtains a data element for the pipeline from the source of data and makes the data element available to the immediately downstream, or second, pipeline section. The second pipeline section sequentially receives the data element from the first pipeline section, processes the data element, and passes it downstream to the next immediately downstream or third pipeline section. Simultaneously, in a true multi-processing environment, the first pipeline section obtains the next data element from the source of data and outputs it to the second pipeline section while the second or downstream-adjacent section of the data pipeline processes the data element received from the first pipeline section and outputs it to the third section of the data processing pipeline. Accordingly, as each data element is processed by one of the pipeline sections, it is output to the next downstream section until it is output to the host application.

In this way, the data can be efficiently and quickly processed in the multi-processing environment by associating one processing operation or processor with each section of the pipeline. This ensures that the pipeline is able to process the data block with the data through-put being limited only by the least efficient pipeline section and the inefficiencies caused by the overhead.

In contrast, in a single-processing environment, a variety of methods for processing the data are available, although all them are extremely inefficient. For example, each data processing operation is applied to every data element of the data block before any other data processing operation is applied to any data element of the data block. That is, every element of the data block must be processed before the next data processing operation is performed on any of the already-processed data elements. Thus, the efficiency of the single tasking data processing operation is proportional to the efficiency of each data processing operation.

Therefore, because data elements continually move from one data processing section of a pipeline in a multi-processing environment, the necessary overhead required to manage the memory allocation of the data block is small in comparison to a single-processing environment, where each data element must be repeatedly read from and written to memory. That is, the overhead required to manage the necessary memory is substantial in a single-processing environment.

SUMMARY OF THE INVENTION

Accordingly, this invention provides for a control system for processing an image by emulating a multi-processing image processing pipeline using a single-processing processor. In a method of this invention, a library of image processing operations is provided. Each image processing operation, or function, in the library is a class or subclass in an object-oriented system. Each section of the pipeline is an instantiated function, or task, and comprises one or more image processing functions and sufficient data structure to self-define the state of the task. In operation, when a host application requires a processed image input from a source of data, such as a scanner or an image data file, an image processing pipeline is formed from the source to the host application. The image processing pipeline is formed by calling one of the functions in the image processing library and initializing the called function to form a task. This task becomes the first or upstream-most section of the pipeline. The first pipeline section obtains a data element of the image to be processed from the source. Preferably, the data element is a single scanline of a raster scan of the image. The source is preferably a scanner, a facsimile machine, a remote computer, a sensor or the like outputting a serial or parallel data signal, or a block of stored data in a ROM, a portion of a RAM, or a disk in a disk drive. The data element can also be directly generated by the first pipeline section itself. In this last case, the data element can be obtained from the value of an initialized variable, from the state of the first pipeline section, or the like. When it is first initialized, the backward or upstream link of the host application is set to the first pipeline section.

A second pipeline section is needed to process the data element obtained by the first pipeline section. Therefore, the host application creates another task by initializing one of the functions in the library. When this second pipeline section is created, it is automatically linked to the first pipeline section. Additionally, the link of the host application is set to the second pipeline section. If no other image processing operation is required, backward link of the host application remains between the portion of the host application which requires the processed data and the second pipeline section.

Alternately, should the pipeline require additional sections, the host application makes additional calls to the function library to create more tasks or pipeline sections. The newly created tasks become the third, fourth, etc. sections of the data processing pipeline. As each additional pipeline section is created, the backward link between each additional pipeline section and the immediately upstream pipeline section is formed. Again, after the last section of the pipeline is created, the backward link of the host application remains set to the last section of the pipeline. In this way, access to each pipeline section is controlled and maintained by the immediately downstream pipeline section (or the host application for the last pipeline section) rather than by the operating system. Thus, the overhead necessary to maintain the memory is minimal and to schedule the execution of the tasks is non-existant. Thus, the control system of the present invention combined the advantages of efficient processing, from the multi-processing environment, with the advantage of minimal overhead, from the single-processing environment, while avoiding the disadvantages of these environments.

Further, the single-processing application can therefore be run on a single-tasking processor, a single-processor, multi-tasking system using automatic timesharing, or a true multi-tasking system, while maintaining the advantages indicated above. That is, since the host application, rather than the operating system, creates, maintains, controls, and ends the pipeline, the pipeline structure is independent of the type of processor running the host application. Therefore, the host application can be one of a number of independent applications being run on a single-processor multi-tasking system. At the same time, the host can be running a pipeline from a scanner using this pipeline system without using the operating system to schedule the pipeline or allocate, maintain, and deallocate memory for the pipeline. Thus, the disadvantages normally associated with running a pipeline using the operating system can be avoided.

To begin processing the image, the host application requests the header of the image from the last section of the pipeline. Each section of the pipeline requests, in turn, the header from the upstream pipeline section to which it is linked. This is done by making a procedure call from the downstream pipeline section to invoke the upstream pipeline section. This is analogous to pushing the downstream pipeline section onto a stack. As the header is requested from each upstream pipeline section, the processor stops processing the downstream pipeline section and begins processing the upstream pipeline section. Once the first pipeline section is reached, the first pipeline section obtains (or generates) the header and returns it as a data element to the second pipeline section. Once the first pipeline section returns the header, the CPU ceases running the first pipeline section and begins running the second pipeline section. That is, the downstream pipeline section is returned to from the procedure call which invoked the upstream pipeline section. This is analogous to popping the downstream pipeline section off the stack. Once the second pipeline section has processed the header, the header is returned to the third pipeline section.

Then, the third pipeline section performs its data processing operation(s) on the processed header received from the second pipeline section, returns the processed header to the fourth pipeline section and stops operating. The header is similarly processed in each pipeline section. After the last pipeline section processes the header, it returns the fully processed header to the host application. Then, the host application requests a processed scanline from the last pipeline section. The above-outlined process is repeated for each scanline request from the host application. If the host has not input the entire image, it requests another scanline. The request again travels upstream to the first pipeline section, and the processed scanline travels downstream to the host application. In this way, the processed scanline down the pipeline in a highly efficient and low overhead manner. In addition, the efficiency of the image processing pipeline depends only on the least efficient link of the pipeline.

Other objects and advantages together with the full understanding of the invention will be apparent and appreciated in reference to the following description and claims taken in conjunction with the accompanying drawings.

BRIEF DESCRIPTION OF THE DRAWINGS

This invention will be described relative to the following drawings, in which like reference numbers refer to like elements, and wherein:

FIG. 5A and 5B show an exemplary code listing for a sample task;

FIG. 6 shows a code listing for an exemplary host application which calls the tasks from the library to form the pipelines;

FIG. 7 shows a listing of the outputs of the pipelines shown in FIG. 4 and listed in FIGS. 5A, 5B and 6;

DETAILED DESCRIPTION OF THE PREFERRED EMBODIMENTS

Figure 1:
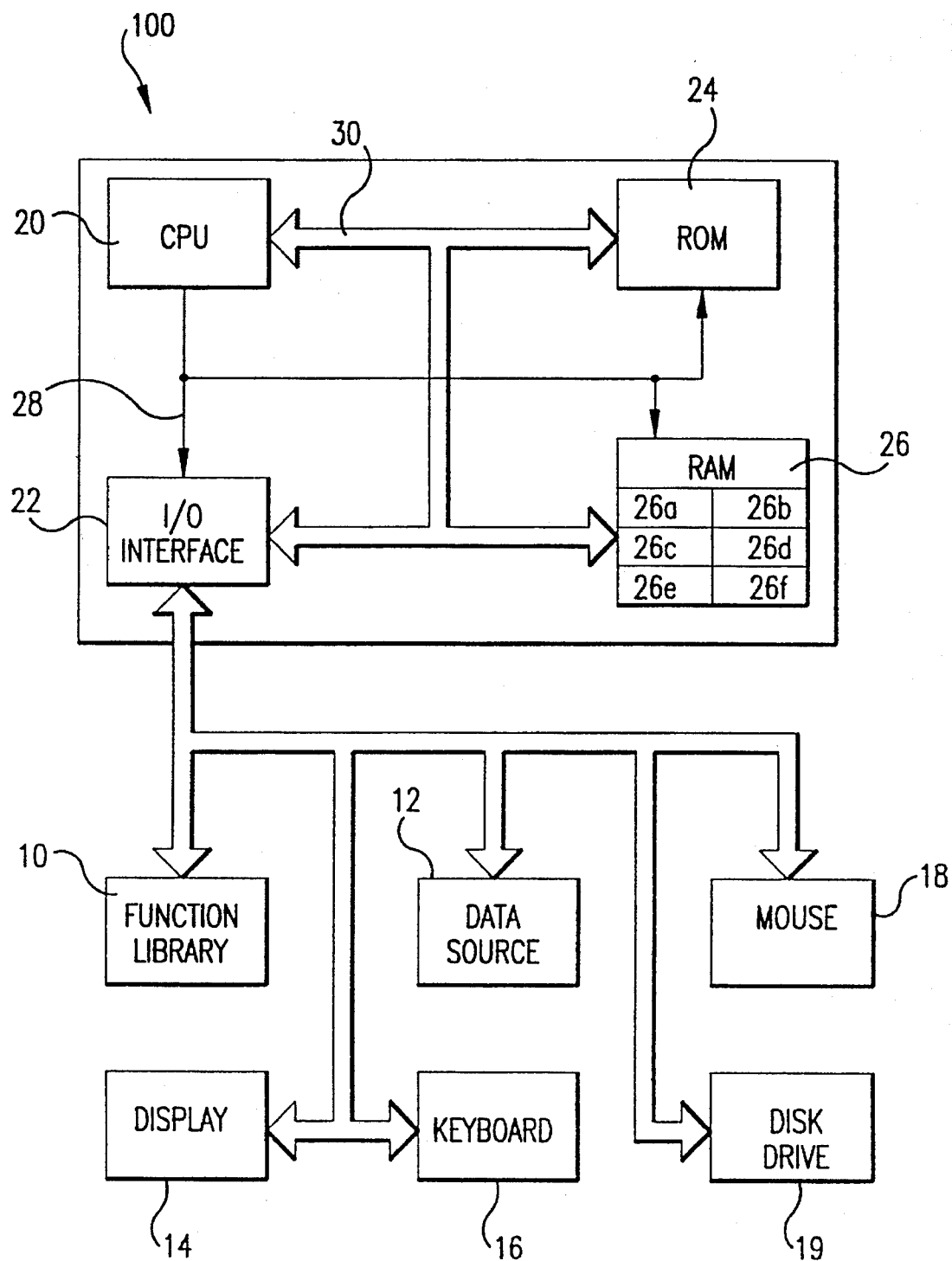
FIG. 1 shows a block diagram of the system of the present invention.

As shown in FIG. 1, a computer 100 has a single-processing controller (CPU) 20. The computer 100 also has an input/output interface (I/O interface) 22, a ROM 24, and a RAM 26. The CPU 20 sends control signals to the I/O interface 22, ROM 24, and RAM 26 through control lines 28, and sends and receives data from the I/O interface, ROM 24, RAM 26 through a data bus 30. A function library 10, a data source 12, a display 14, a keyboard 16, a mouse 18, and a disk drive 19 are connected to the CPU 20 through the I/O interface 22. The mouse 18 represents any secondary pointing device, such as a mouse, a trackball, a light pen, a touchscreen, a touchpad or the like. The disk drive 19 represents any non-volatile storage device, such as a hard drive, a hard card, a floppy disk and floppy disk drive, a CD-ROM and CD-RAM disk drive, a flash memory or the like.

The CPU 20 is a single-processing processor. That is, the CPU is able to actively process data for at most one application at a time, and is able to already run and perform only a single data processing operation at any one time. The I/O interface 22 connects the CPU 20 through either a serial data port (not shown) or a parallel data port (not shown) to serial or parallel data input sources or data output sources. These sources of data of course include the disk drive 19 and the mouse 18, as well as the keyboard 16 and the data source 12. The data source 12, as noted above, includes a scanner, a facsimile machine or the like, a remote computer, a sensor or the like. The I/O interface 22 also comprises the hardware necessary for driving the display 14 and for inputting signals from the keyboard 16, the mouse 18 and the disk drive 19.

The ROM 24 stores all the basic operating programs for the CPU 20, including bootstrap programs and the like. The RAM 26 comprises a large number of randomly accessible memory locations. The RAM 26 can be divided into blocks of allocatable memory, such as blocks 26a, 26b, 26c, 26d, 26e and 26f. The blocks of allocatable memory 26a–26f store a host application and one or more instantiations of the data processing data structures forming the tasks, (i.e., the sections of the data processing pipeline). The display 14 outputs visual information, while the keyboard 16 is used to input information to the computer 100.

The function library 10 stores a library of uninitialized data processing structures or objects which form the data processing functions called by the CPU 20. While the function library 10 is shown as an independent element accessed through the I/O interface 22, it is understood that the function library 10 can be stored in the ROM 24 or on a nonvolatile memory device accessed through the disk drive 19. Further, newly written data processing objects or functions which have not yet been stored to the non-volatile memory device in the disk drive 19 or to the function library 10 can be stored in the RAM 26.

Likewise, the data source 12 is shown as being external to the computer 100 and accessed through the I/O interface 22. However, it is understood that the data source 12 can be data stored in the ROM 24, the RAM 26, on the non-volatile memory device in the disk drive 19 or within a register counter or internal memory of the CPU 20. The data source 12 can comprise data input through the keyboard 16. Finally, as noted above, the first pipeline section can generate the data elements itself, rather than obtaining them from some external source.

Figure 15:
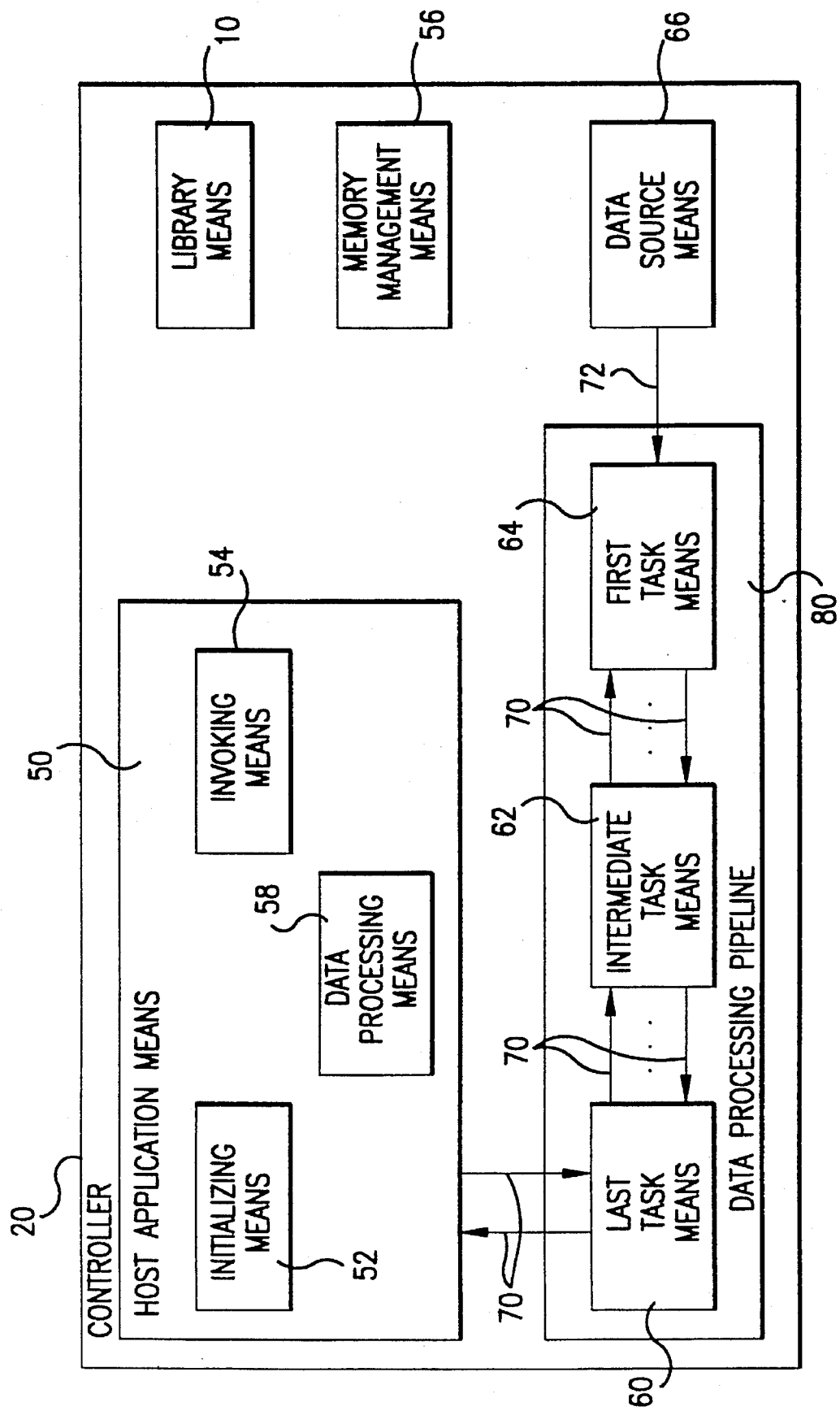
FIG. 15 shows a block diagram of the controller of the present invention.

As shown in FIG. 15, the controller 20 of the present invention comprises a host application means 50, a library means 10, a memory management means 56, a last task means 60, at least one intermediate task means 62 and a first task means 64. The controller may also include a data source means 66. However, the controller 20 need not include the data source means 66. In this case, the first task means 64 also performs the function of the data source means 66. A plurality of links 70 connect the first task means 64, the at least one intermediate means 62 and the last task means 62 in a data processing pipeline 80 connected by a link 70 to the host application means. Of course, it should be understood that simple pipelines 80 may include only the first task means 64 and the last task means 60. Finally, a data input link 72 connects the data source means 66 to the first task means 64.

The host application means 50 includes a data processing means 58 for further processing data received from the data processing pipeline 80. Initially, the controller 20 includes only the host application means 50 the library means 10, and the memory management means 56. The host application means 50 operates the controller 20 according to instructions contained within the host application means 50. The controller 20 can be a single-tasking controller, a single-CPU, multi-tasking controller or a true multi-CPU, multi-tasking controller. In any case, the host application means 50 itself creates a single-tasking environment within the controller 20.

When the host application means 50 determines that it needs processed data from the data source 66, it creates and invokes the data processing pipeline 80. The host application means 50 thus includes an initializing means 52 and an invoking means 54. The initializing means accesses the library means 10 to obtain a function and initialize the function to create a task. That is, the library means 10 stores a number of data processing functions. The data processing functions are classes or subclasses of objects within an object-oriented system when in the library, the functions are uninitialized.

The initializing means 52 accesses the library means 10 to obtain one of the uninitialized functions. The initializing means 52 then initializes the obtained function to create an instantiated function or task in the controller 20. The instantiated function, or task, is linked to the host application means 50 or another previously created task. If the task is linked to the host application means, it is the last task 60. If the task is linked to another task, and another task is linked to it, it is an intermediate task 62. If the task is linked to another task, and obtains data from the data source means 66, or generates data itself, it is the first task 64.

In initializing the function to create a task, the initialization means 52 works with the memory management means 56 of the controller to allocate one of the memory blocks 26a–26f of the memory 26 to store the task. After all of the desired tasks are initialized by the initializing means 52, the invoking means 54 invokes the pipeline 80 by requesting data from the last task means 60. The request from the invoking means 52 ripples in an upstream direction of the pipeline 80 towards the first task means 64. When the request reaches the first task means 64, the first task means obtains data from the data source 66 or generates the data itself. Then, the first tasking means 64 returns the data in the downstream direction to the intermediate task means 62. The intermediate task means 62 processes the data and returns it to the last tasking means 60. The last task means 60 processes the data and returns it to the host application means. Then, if more data is needed by the host application means, the invoking means 54 again invokes the pipeline 80.

Once the host application 50 has all of the desired data, the invoking means 54 again invokes the pipeline 80 to shut down and cleanup any errors arising from the pipeline 80, by requesting error codes from the pipeline. The request ripples upstream as before. Each tasking means determines if it generated any error codes and returns them. Once the error codes are returned, the initializing means 52 signals the memory management means 56 to release the memory allocated to the task means 60–64 of the pipeline 80.

Figure 16:
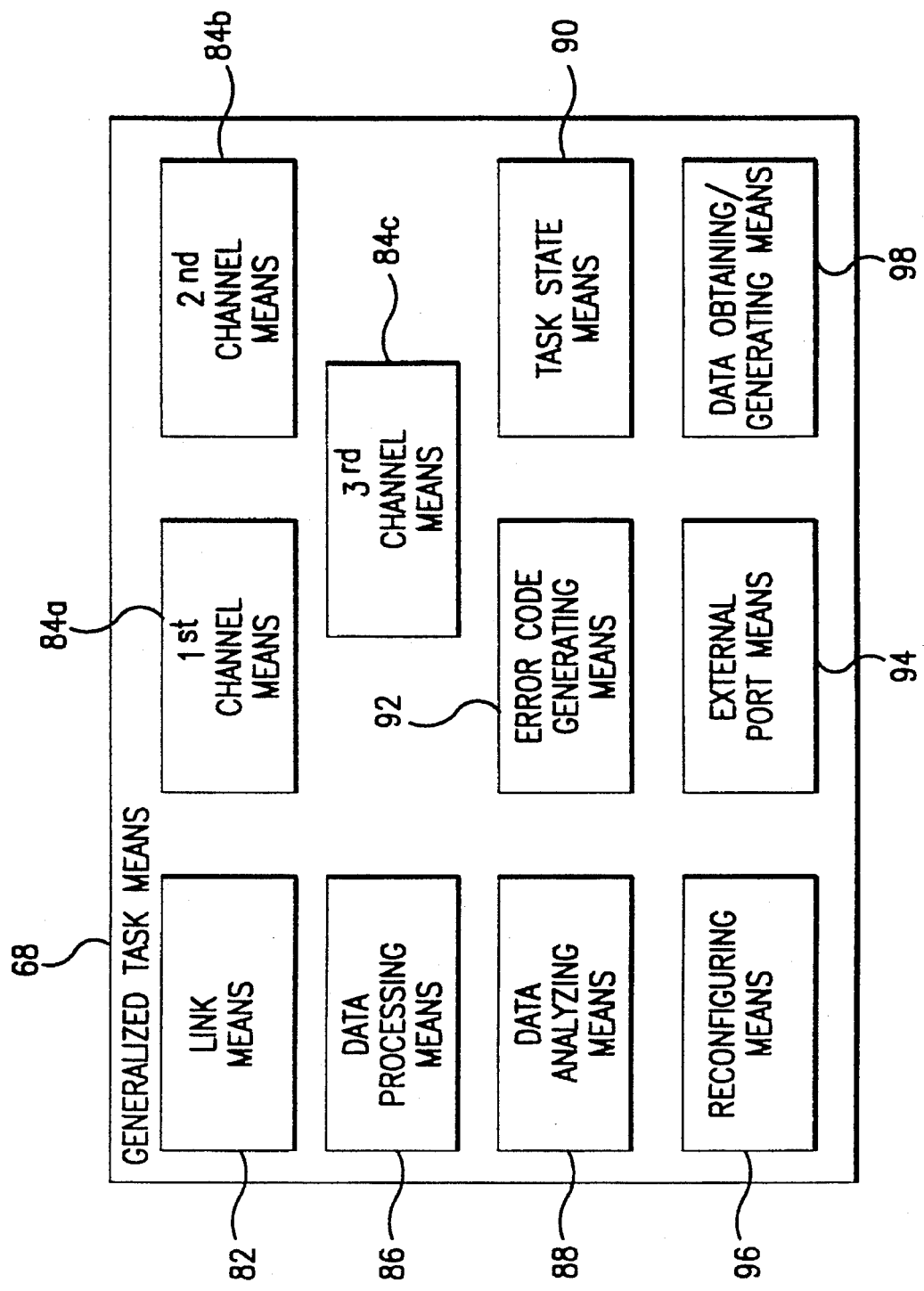
FIG. 16 shows a block diagram of a generalized task of the present invention.

FIG. 16 shows a generalized task means 68, which represents any of the task means 60–64. The generalized task means 68 comprises a link means 82, at least one channel means 84, a data processing means 86, a data analyzing means 88, a task state means 90, an error code generating means 92, an external port means 94 and a reconfiguring means 96. Of course it should be understood that the actual tasks means 60–64 may have different combinations of these elements, lacking one or more of them. Further, the first task means 64 will also include a data obtaining/generating means 98 for obtaining or generating data for the pipeline 80.

The link means 82 links the generalized task means 68 to a next or upstream task means 68 when a forward link is used, or a previous or downstream task means 68 when a backward link is used. Of course both links can be used at once. The generalized task means 68 receives data returned from the next task means 68 through the channel means 84. The data is then processed using the data processing means 86 before it is returned to the previous task means 68 through the channel means 84.

The task state means 90 maintains the state of the task means 68. The task state means 90 also controls all of the other means of the task means 68.

The data analyzing means 88 determines if the data received from the next task means 68 is suitable for the data processing means 86. If the data is not suitable, the data analyzing means has two alternate possible responses. In a first type of response, a simplified task means 68 simply returns an error code generated by an error code generating means 92, instead of the data, to the previous task means. When the host application means 50 receives the error code instead of data, the application means 50 uses an error handling system to determine the nature (and cause) of the error. The host application means 50 can then gracefully exit or attempt to recover from the error by reconfiguring and/or reinitializing the pipeline 80.

In a second type of response, a complex task means 68 includes a reconfiguring means 96, which attempts to dynamically reconfigure the pipeline 80 to recover from the error. The reconfiguring means 96 does this by dynamically initializing additional task means 68 and inserting them into the pipeline 80. The reconfiguring means does this by accessing other tasking means 68 through the external port means 94. The external port means permit a variety of access modes to the tasking means 68. These modes include examining and/or altering the task state means 90, examining the error code generating means 92, altering the link means 82, or the like.

Of course, even if the task means 68 has a sophisticated reconfiguring means 96, unrecoverable or hard errors may still occur. In this case the task means again uses the error code generating means 92 to generate the error code.

Finally, in a second embodiment, the link means 82 can link, instead of the task means 68 itself, the channel means 84. That is, the link means 82 links the channel means 84 directly to the next or previous task means 68. Therefore, if a task means 68 has a number of channel means 84a, 84b, 84c, each channel means 84a–84c can be linked to a different next or previous task means 68. In contrast, in the first embodiment, because the link means 82 linked task means 68, all of the channels 84a–84c of the task means 68 would be linked to the same next task means 68.

Figure 2:
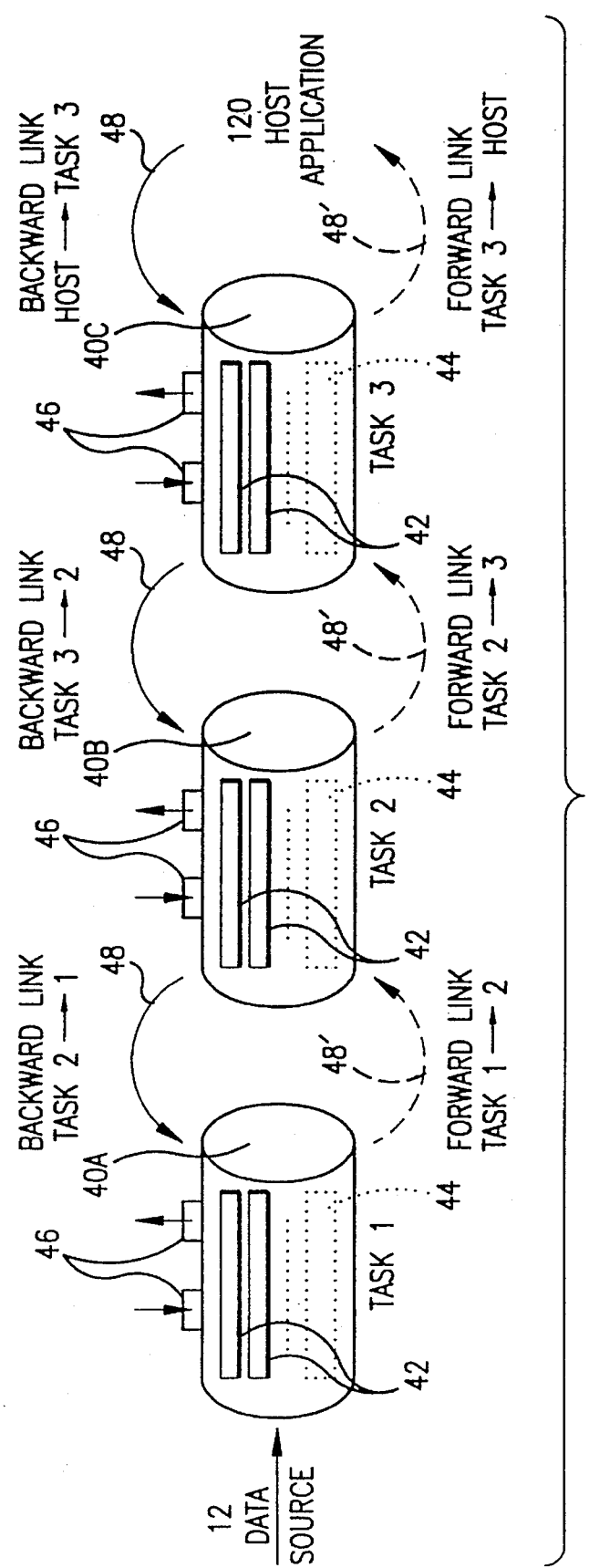
FIG. 2 shows a block diagram of a pipeline of the present invention.

As shown in FIG. 2, each initialized function, or task, can be visualized as a section 40a, 40b and 40c of the pipeline 40 running between the data source 12 and the host application 120. The host application is the application currently being run by the CPU 20 (and stored in the RAM 26). Each section 40a, 40b and 40c of the pipeline 40 comprises one or more data processing channels 42, a data structure 44 defining the state of the pipeline section and zero, one or more external ports 46. Each pipeline section 40b and 40c and the host application also comprises a backward link 48 which links the pipeline section 40b, 40c or the host application 120 to the the immediately upstream pipeline sections 40a, 40b or 40c, respectively. Alternately, each pipeline section 40a, 40b and 40c has a forward link 48' to the immediately downstream pipeline section 40b and 40c or the host application 120. Finally, both the backward links 48 and the forward links 48' can be provided.

In the preferred embodiment of the control system, the pipeline comprises "intelligent" pipeline sections. These intelligent pipeline sections are able to dynamically reconfigure the pipeline as it is operated from the host computer, without needing any intervention by the host application. For example, the pipeline section 40b is able to determine if it is able to process the data element returned by the pipeline section 40a. If pipeline section 40b is not able to process the data element, pipeline section 40b dynamically calls the function library 10 and creates a new pipeline section 40d. The pipeline section 40d is linked to the pipeline section 40a. The pipeline section 40b then alters its own link, to point to the pipeline section 40d rather than the pipeline section 40a.

Alternately, if the pipeline section 40b determines that it is not able to process the data, (even if it were to reconfigure the pipeline), then it returns an error code indicating the hard error. An error handling system in the host application determines, from the library, the nature of the error. In one embodiment, the host application will determine if it can recreate the pipeline to recover from the error. If so, it will re-initialize the pipeline. However, if the host application is not able to recover from the error, or is not provided with this capability, the host application will gracefully exit.

Such a non-recoverable error can occur, for example, in processing an image. If the header indicated that there are 1000 scanlines in the image, but no scanline image data element was returned on the 998$^{th}$ call to the first pipeline section, the system will encounter a hard error. This error cannot be recovered from, regardless of the ability of the pipeline to reconfigure itself, as there is simply no data to process. In this case, the first pipeline section will return an "ERR" error code. The host application will then use the error handling system to determine the reason for the error code. After determining the nature of this error, the host application will gracefully exit, as any reconfiguring or re-initializing of the system is pointless.

If the pipeline is reconfigured, then the pipeline section 40*b* requests data from the pipeline section 40*d*. The pipeline section 40*d* requests data from the pipeline section 40*a*, which re-returns the data element. However, the pipeline section 40*a* now returns the data element to the pipeline section 40*d* rather than the pipeline section 40*b*. Alternately, the pipeline section, when calling the function library 10, can provide the data element, so that the pipeline section 40*d* has the data element as soon as it is created. Then, when the pipeline section 40*b* requests data from the pipeline section 40*d*, the pipeline section 40*d* can immediately process and return the data element.

Further, if the forward link 48' is provided, the intelligent pipeline section can include, in their data structures, means for determining if the data element needs to be processed by this pipeline section. If not, the pipeline section can dynamically reconfigure the pipeline, without any involvement by the host application, to remove itself from the pipeline. The forward link is necessary, so that this pipeline section knows which downstream pipeline section to alter, so that it is linked to the proper upstream pipeline section.

The external ports 46 are used to examine the current state of a pipeline section, to write data to the data structure 44 of a pipeline section, to change that pipeline section's current state or to dynamically alter the linkage 48 of the pipeline section(s) to dynamically add sections to or delete sections from the pipeline 40. In general, the external ports 46 are used to control the pipeline 40, independently of the data channels 42, which only process the data elements. That is, the data channels 42 are used solely to process the data received from an upstream pipeline section and output the processed data to a downstream pipeline section. The external ports 46 allow access to the data structure 44 of the pipeline section without affecting the operation of the data channels 42.

Thus, in an alternate embodiment, if it becomes necessary, for example, after the pipeline 40 is created, to add the pipeline section 40*d* between the pipeline section 40*a* and the pipeline section 40*b*, this is accomplished using the external ports 46. In this example, the pipeline section 40*c* has, as a part of its data structure, a structure for testing the data in the channels. If the form of data is, for example, incompatible with the form necessary for the proper operation of pipeline section 40*c*, but the data must be altered before, for example, pipeline section 40*b*, the pipeline section 40*c* dynamically initializes the new pipeline section 40*d* and inserts it between the pipeline sections 40*a* and 40*b*. The pipeline section 40*c* does this by accessing, through an external port 46 in the pipeline section 40*b*, the data structure 44 of the pipeline section 40*b*. The pipeline section 40*c* alters the link 48 of the pipeline section 40*b*, to change the link 48 from the pipeline 40*a* to the new pipeline section 40*d*. Likewise, the data structure 44 of the new pipeline section 40*d* is accessed to ensure it is properly initialized and linked to the pipeline section 40*a*.

In operation, when a host application, such as the application shown in FIG. 6, requires data from the data source 12, the host application first forms the pipeline 40 by calling and initializing functions from the function library 10. In the example shown in FIG. 6, the variables "i", "n", "add value", and "mul value" are initialized in line 5 of the host application. In line 6, the first task 40*a* is defined as a "null" task. While the first task can be connected to obtain data elements from the data source 12, it is possible to indicate, using the "null" command, that the first task 40*a* also serves as the data source 12. In line 7 of FIG. 6, the number of tasks in the pipeline 40 is determined by the command line, shown in FIG. 7, which initiated the host application. In general, the length and constituents of the pipeline 40 will be dynamically determined as the host application runs. Alternately, the length and constituents of the pipeline 40 are expressly set forth in the host application. Finally, even when the initial length and constituents of the pipeline 40 are either dynamically determined or expressly set forth, the pipeline 40 can dynamically reconfigures itself depending upon the data received from the data source 12.

In the example shown in FIG. 6, as shown in line 7, the length of the pipeline 40 is expressly set forth in the command line initiating the program. In this case, the length of the pipeline is 5, as shown in FIG. 7. As shown in lines 8 and 9 of FIG. 6, each function is called and initialized, extending from the data source to the host application. In this case, as shown in line 6 of FIG. 6, the first task 40*a* also acts as the data source. Further, as indicated in line 9, each task in the pipeline 40 is a different instantiation or task of the same function. As indicated in line 9 of FIG. 6 and line 17 of FIG. 5A, when the function in this example "Math Task" is initialized, its data structure contains two channel data buffers, each set to the current value of "i", and a pointer pointing to the upstream task in the pipeline. Additionally, if there is no upstream task in the pipeline, the pointer is set to "null".

As the functions in the function library 10 are defined as objects in an object-oriented language, each time a function is initialized in the example shown in FIG. 6, it is in fact a different instantiation of the same function. Thus, a single pipeline 40 may have multiple copies of any single function. Each copy of the function is thus a different instantiation of the base function stored in the library and acts as a different task or section of the pipeline 40. Thus, the functions in the function library 10 are recursive, as they can be used more than once in any single pipeline.

After each task in the pipeline is created, in lines 8 and 9, the channels of the initialized tasks, in this case two, are executed in lines 10 and 11. Once the host application shown in FIG. 6 receives the final data from the tasks through the channels executed in lines 10 and 11, the output shown in FIG. 7 is printed, as set forth in lines 12 and 13 of FIG. 6.

As indicated above, in lines 8 and 9, in the host application of FIG. 6, the pipeline comprises a number of independent instantiations of the function "MathTask". FIGS. 5A and 5B show the library object "MathTask" which is called by the host application in lines 8 and 9 of FIG. 6, to form each instantiation necessary for the pipeline formed by the host application, as shown in FIG. 6.

In lines 1–6 of the "MathTask" function shown in FIG. 5A, the primary data structure is defined. As shown in lines 1–6, the data structure includes two channels, channel 1 and channel 2, and a backward or upstream link. Next, in lines 7–12, the data structure particular to this function, "aval" and "mval", for the first and second channels, respectively, are defined.

Next, in line 17, the instantiation procedure for the task "MathTask" is defined, with the data requests "avalue" for channel 1 and "mvalue" for channel 2 and the upstream link "link". In lines 18–20, the variables "avalue" and "mvalue", for channel 1 and channel 2, respectively, and the link are defined. Finally, in line 21, the procedure for creating a task of the function "MathTask" and for allocating a memory block of the RAM 26 is defined.

Next, as shown in lines 28–37 of FIG. 5B, the data processing procedure and data structure associated with channel 1 is defined. The channel 1 data processing procedure obtains a number from the immediately upstream task. Additionally, as indicated in line 6 of FIG. 6, the first task in the pipeline is a "null" task. The result arising from the "null" status for the first task is defined in line 32, which defines the initial value of "val" as zero. In line 33, if a backward link exists, the value "val" is set, in line 34, to the channel 1 output of the upstream task. Then, in line 35, the value "val" is updated by adding the channel 1 addend "aval" of the current pipeline section to it. The channel 1 addend value "aval" for each pipeline section was set in line 25 to the state parameter "avalue" of the pipeline section, which was set in line 9 of FIG. 6. Finally, the channel 1 data processing procedure ends by returning the new value "val" to the immediately downstream pipeline section.

Similarly, in lines 38–47 of FIG. 5B, the channel 2 data processing procedure is defined. The only differences occur in line 39, which uses the channel 2 procedure initialized in line 23 of FIG. 5A rather than the channel 1 processing procedure initialized in line 22 of FIG. 5A. Further, in line 42 the value "val" is preset to one to account for a "null" data source for first pipeline section. In line 45 the new value "val" is equal to the old value "val" multiplied by the channel 2 multiplicand, which was set to the state parameter "mvalue" in line 26 of FIG. 5A, which was set in line 9 of FIG. 6.

Figure 4:
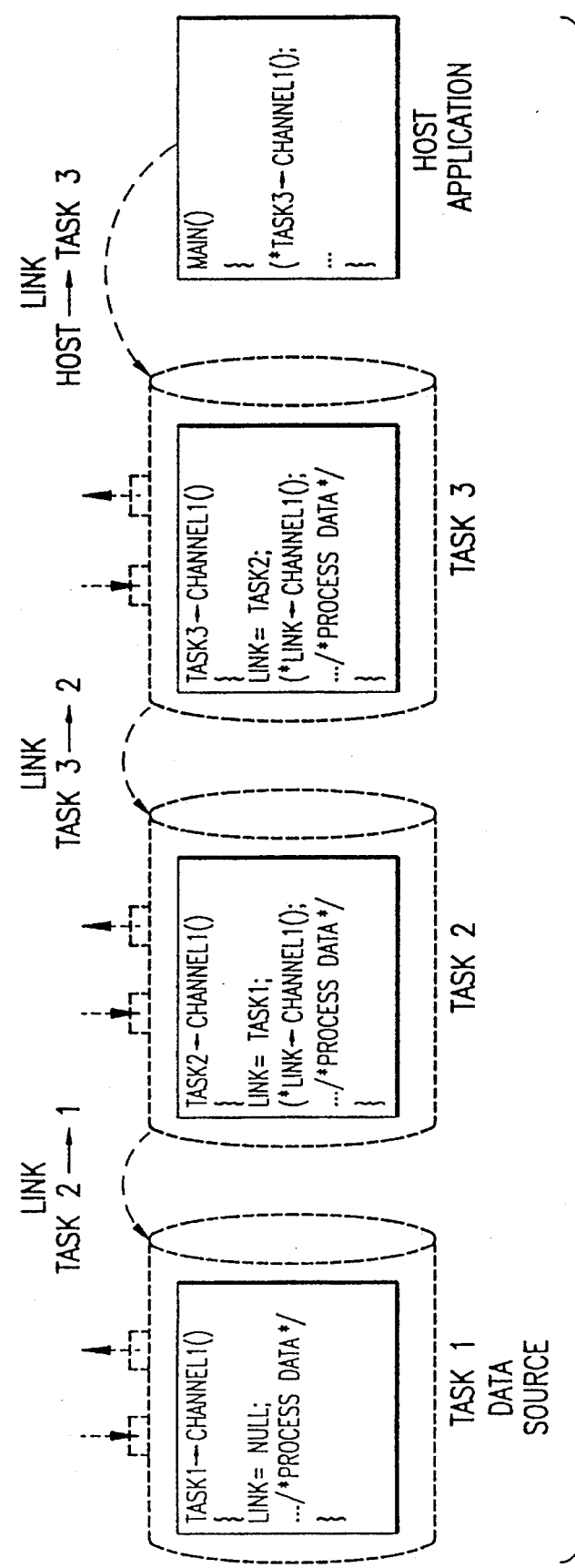
FIG. 4 shows a diagram of a linked pipeline for an exemplary data processing program.

In operation, the host application, shown in FIG. 6 in lines 8 and 9, calls the function "MathTask" an indicated number of times. The first instantiation of the function "MathTask" is set up as a null task, unconnected to a data source. By looping again through lines 8 and 9, a second instantiation of the function "MathTask" is formed with a backward link to the previous instantiation of the task "MathTask". Thereafter, for each loop through lines 8 and 9 of FIG. 6, a further instantiation of the function "MathTask" is formed. Once the last loop through lines 8 and 9 of the host application shown in FIG. 6 is completed, the backward link from the host application to the last one of the tasks "MathTask" remains set. FIG. 4 shows a three-section pipeline initialized in this manner.

Figure 3:
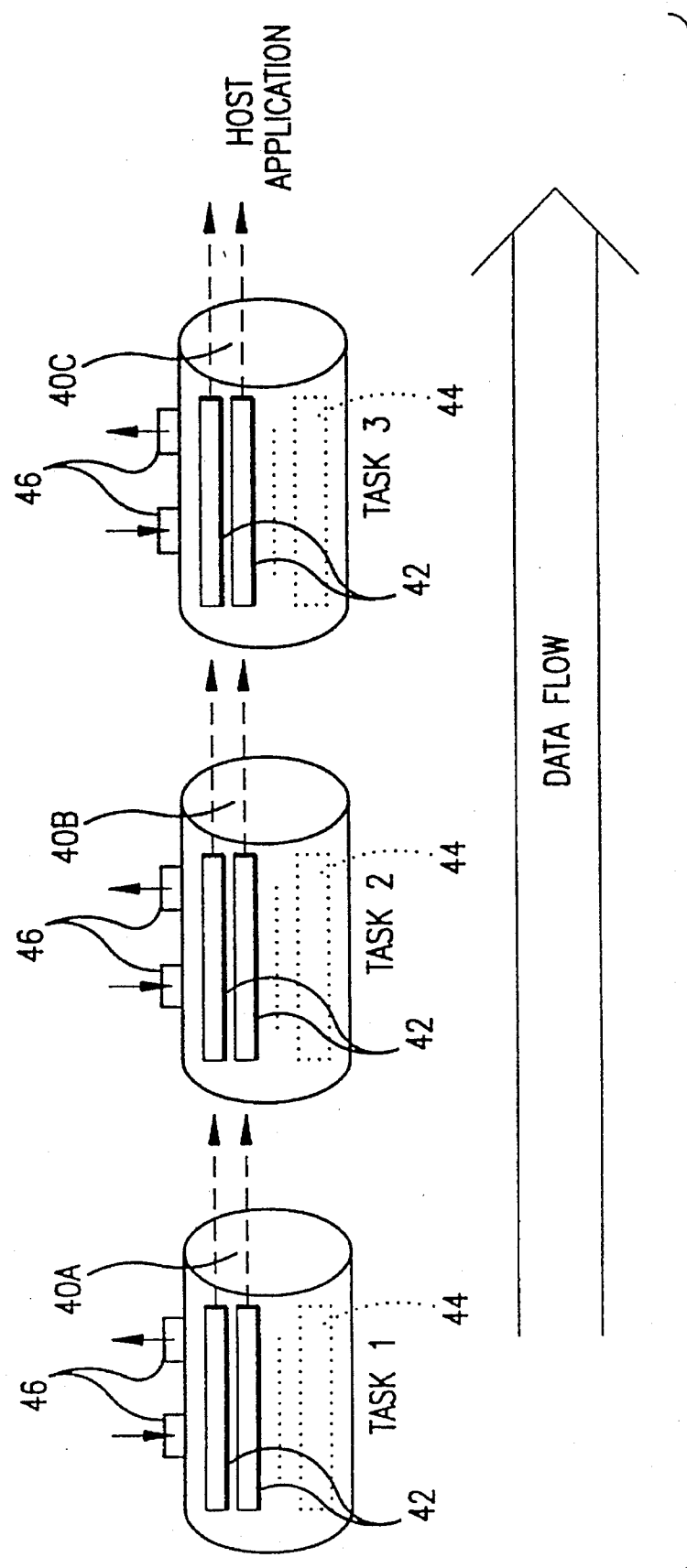
FIG. 3 shows a block diagram of a flow of data in the pipeline of the present invention.

Then, in lines 10 and 11, the host application requests data from channel 1 and channel 2 of the last instantiation of the function "MathTask". The last task turns around and requests data from the task immediately upstream of it. This continues until the first instantiation of the "MathTask" receives a request for data through channel 1 and channel 2. FIG. 3 shows an example of this type of data flow. After the host application involves the pipeline in lines 10 and 11 of FIG. 6, the last pipeline section invokes each channel, in lines 34 and 44 of FIG. 5b of the pipeline section to which it is linked. Then, in turn, each invoked pipeline section invokes the upstream pipeline section to which it is linked. When the first pipeline section is reached, it obtains the data element from the data source 12, or, in this case, self-generates the data element. The first pipeline section then returns the data element to the pipeline section which called it, as described above.

The first instantiation of the function "MathTask" then performs the data processing procedures defined for channel 1 and channel 2. The first instantiation returns a value of 1, equal to 0+1, for channel 1 and a value of 1, equal to 1×1, for channel 2, to the second or instantiation of the function "MathTask". In turn, each instantiation of the function "MathTask" adds a first number to the value held in channel 1 and multiplies the number held in channel 2 by a second number. In the example shown in FIGS. 5A and 5B, the first and second numbers are the addend and the multiplicand initialized when the pipeline was created in line 9 of FIG. 6. However, the numbers could have been generated dynamically. Accordingly, the processed data in channels 1 and 2 ripples downstream towards the host application. Eventually, the downstream-most instantiation of the function "MathTask" provides the requested data to the host application.

When the CPU 20 runs the host application shown in FIG. 6, it stores the host application in memory block 26a of RAM 26. The host application is actually a data structure stored in the allocatable memory block 26a. The data structure itself comprises a template over the designated memory locations, the template defining the flow of control operations of the CPU 20. In a first section of the allocated memory block 26a, various memory locations are defined and/or allocated as variables. The data block 26a also contains various memory locations defining the state of the host application, and various memory locations acting as buffers for storing data requested by the host application or data being processed by the host application.

Similarly, when the host application calls the function library 10 to initialize, for example, an instantiation of the function "MathTask", another data block 26b is allocated to that task or pipeline section. Like the host application, the initialized pipeline section is actually a data structure in the allocated memory block 26b comprising a template over the allocated memory block 26b. The allocated memory block includes buffers for storing data being processed, various memory locations for defining types of data, procedure pointers indicating from where this task receives its data from, various memory locations storing data defining the state of the task and one or more data buffers for storing the processed data received from an immediately upstream instantiation of the function "MathTask".

The allocated data block 26b also includes the data structures defining the data processing operations for channels 1 and 2. The data structure in the allocated data block 26b alternately includes look up tables for performing the data processing or as a pointer look up table to other functions in the function library 10. In general, each task, as it is initialized and allocated to one of the data blocks 26a–26f, automatically allocates buffers sufficient for the data inputs, data outputs, task state and various data processing procedures performed by the task.

Figure 8:
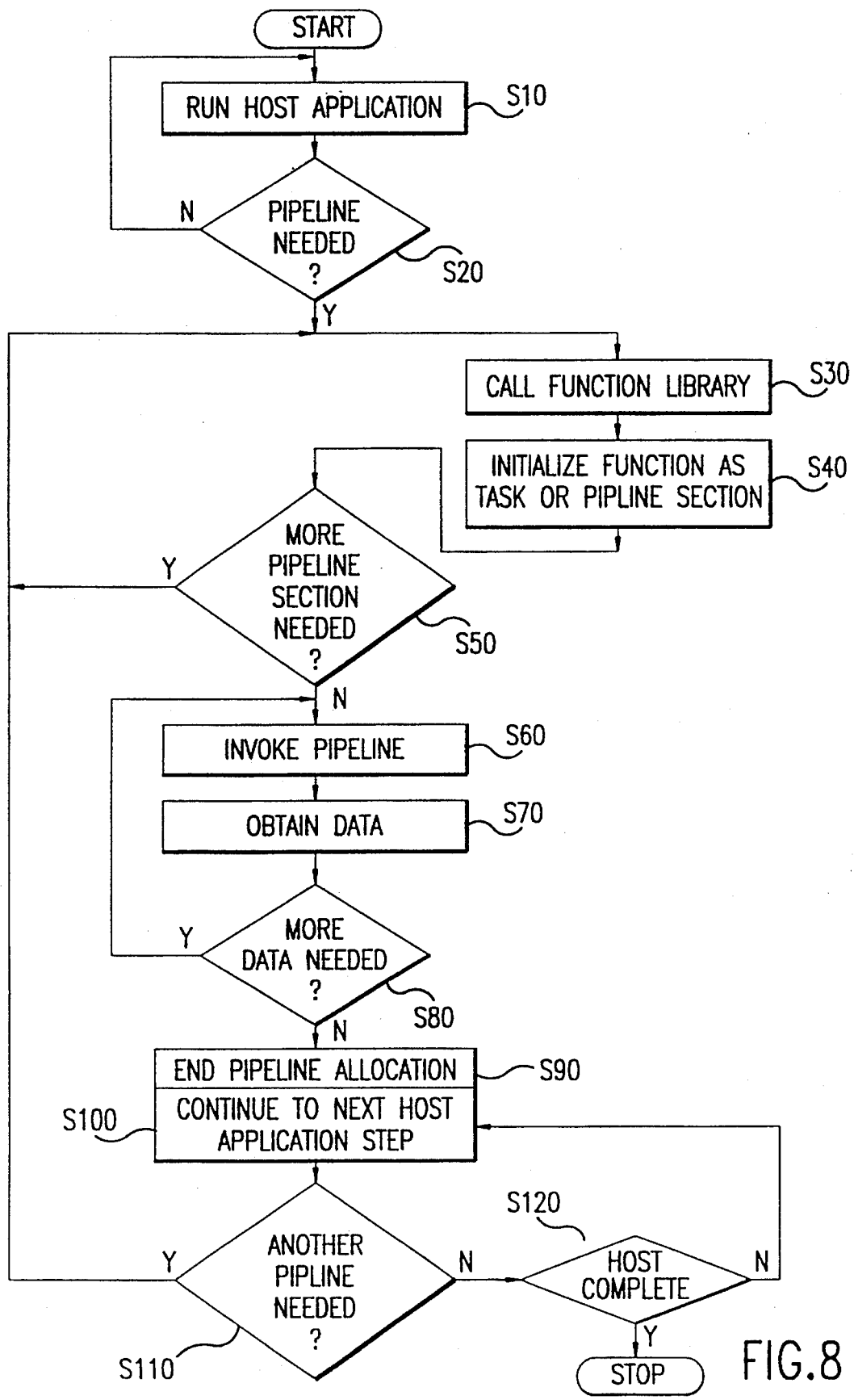
FIG. 8 is a flow chart of the main routine.
Figure 9:
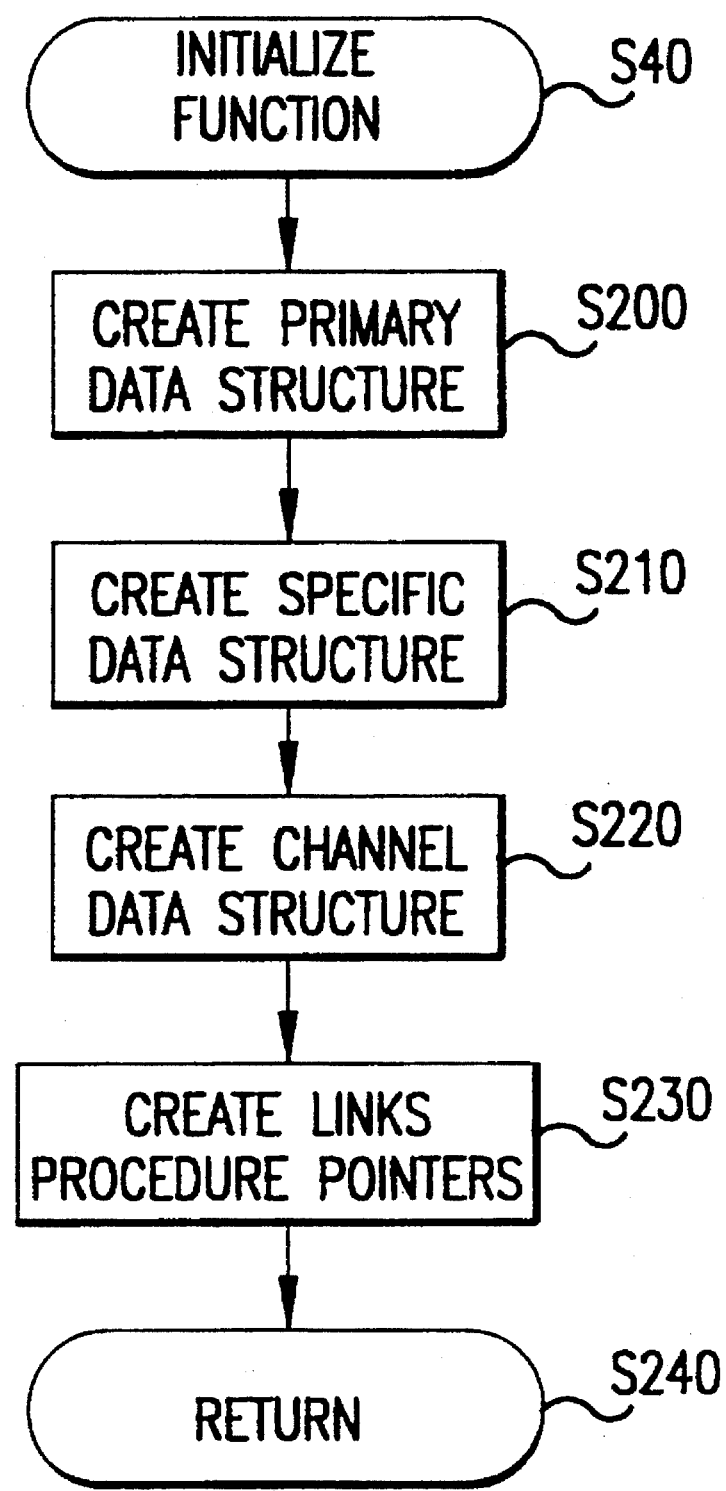
FIG. 9 is a flow chart of the function initialization routine.
Figure 10:
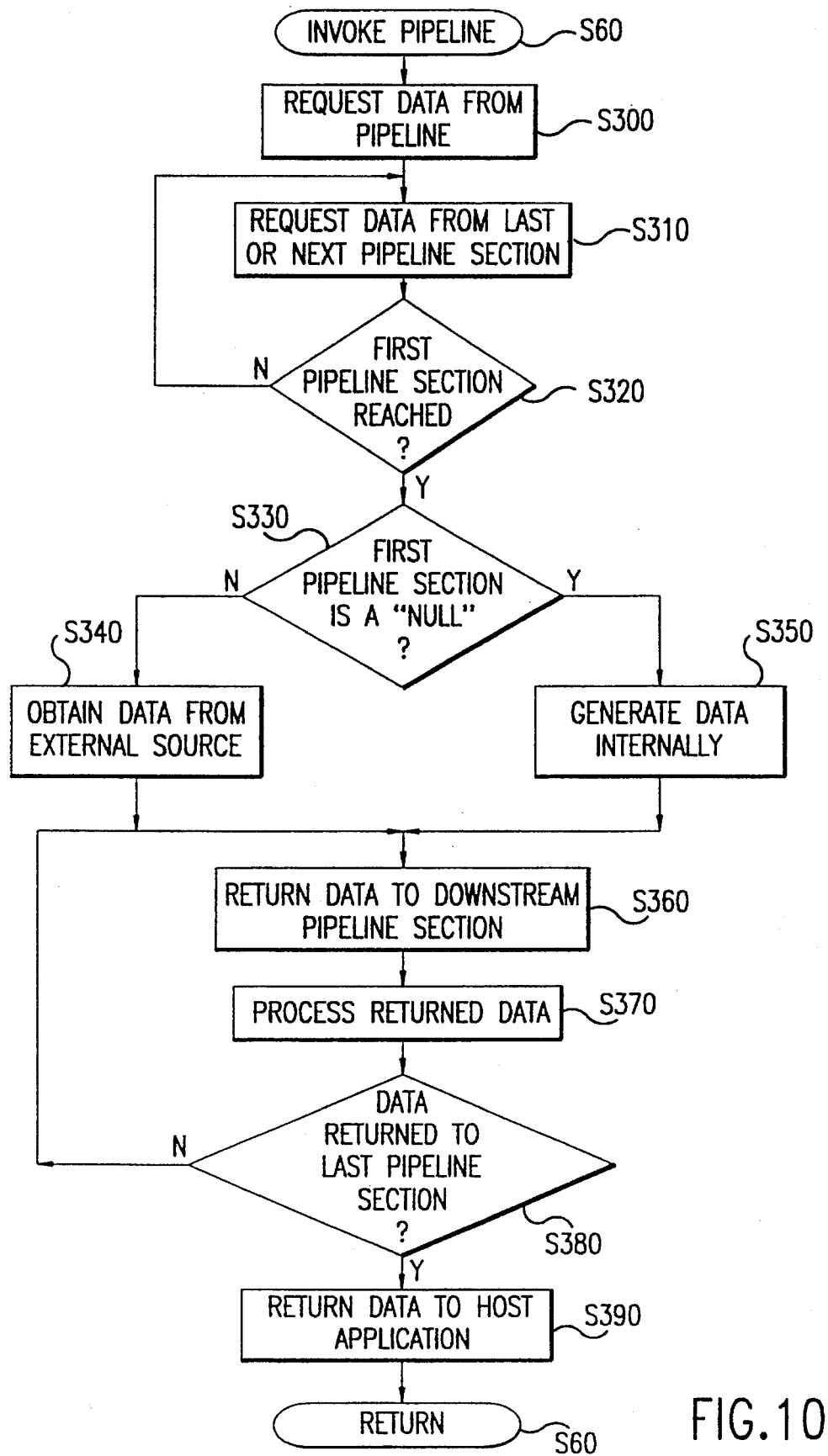
FIG. 10 is a flow chart of the invoking and processing routine.
Figure 11:
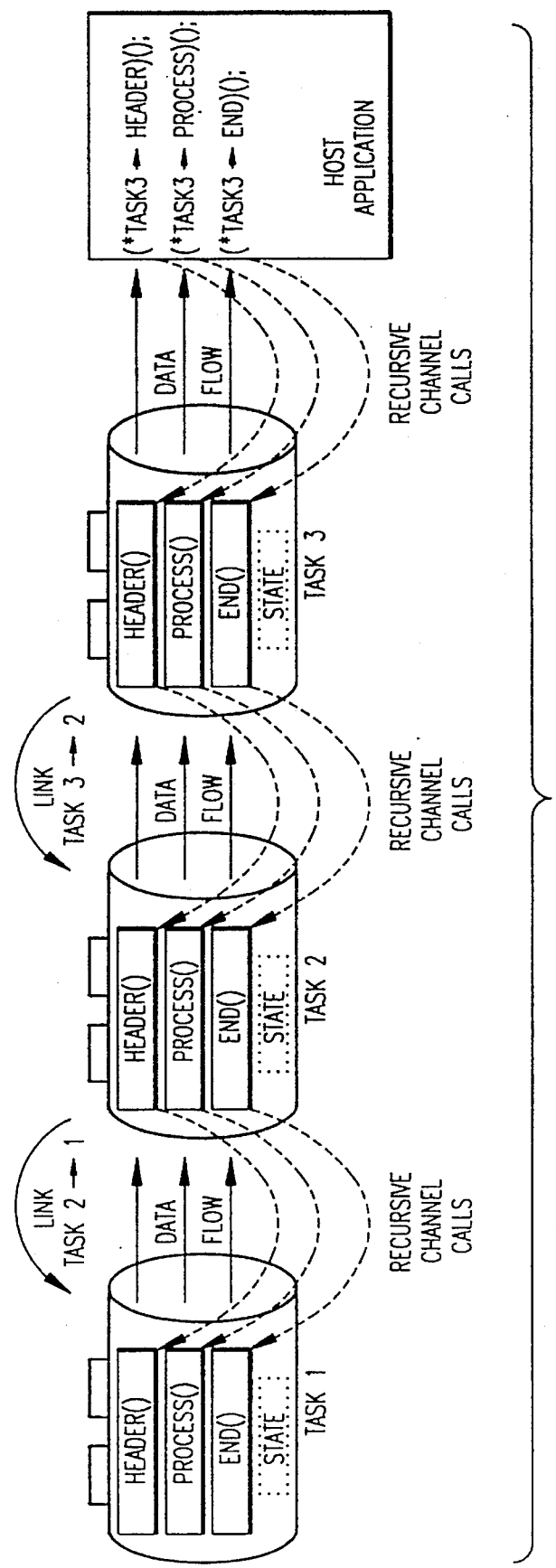
FIG. 11 shows an image processing pipeline.

FIGS. 8–10 show generalized flow charts for the control routine implementing this method. As shown in FIG. 8, after starting, the host application is run by the single processing CPU 20 in step S10. In step S20, the controller checks to see if a data processing pipeline is needed in the current operation of the computer 100. If not, the control routine returns to step S10.

However, if a pipeline is needed, the control routine continues to step S30, which calls a function from the function library. Then, in step S40, the called function is initialized to form a first task or first pipeline section. Then, in step S50, the controller checks to see if any additional pipeline sections are needed. If so, the control routine returns to step S30 to call the next function from the library. Accordingly, the control routine loops through steps S30–S50 until no further tasks are needed. At this point the control routine continues to step S60.

At step S60, the pipeline is invoked. In step S70, the pipeline returns the processed data element to the host application. Then, in step S80, the controller determines if any additional data is needed. If so, the control routine returns to step S60 to again invoke the pipeline.

However, if no further data is needed, the control routine continues to step S90, where the pipeline is de-initialized by de-allocating the memory allocated to the various pipeline sections. In step S100, the next command of the host application is run. Then, in step S110 the controller determines if any further pipelines of the host application need to be run. If so, the control routine returns to step S30.

However, if a pipeline is not needed at this point, the control routine continues to step S120, where the controller determines if the host application is finished. If so, the control routine stops. Otherwise, the control routine returns to step S100.

FIG. 9 shows the flowchart for the initializing step S40. After entering the initializing routine in step S40, the control routine continues to step S200, where the primary data structure for the task is created. Then, in step S210, the portion of the data structure specific to this task is created. Then, in step S220 the channel data structures are created, and in step S230 the backward link is created. If a forward link is necessary, its data structure is defined, but it will not be finished until the pipeline is invoked, as the downstream task to which the forward link links has not yet been created. The link comprises a procedure pointer for calling the linked pipeline section. Then, in step S240, the control routine returns to step S40.

FIG. 10 shows the flow chart for the invoking routine of step S60. Starting from step S60, the control routine continues to step S300 where the host application requests data from the last pipeline section. Then, in step S310, the current pipeline section requests data from the next upstream pipeline section. In step S320, the controller determines if the next pipeline section is the first pipeline section. If not, the control routine returns to step S310.

However, if the next pipeline section is the first pipeline section, the control routine continues to step S330. In step S330, the controller determines if the first pipeline section is a "null" section. If not, the control routine continues to step S340, where the first pipeline section obtains the data element from an external source. If the first pipeline section is a "null" section, the control routine continues to step S350, where the first pipeline section self-generates the data element.

In either case, after either steps S340 and S350, the control routine continues to step S360, where the first pipeline section returns the data downstream to the second, or next pipeline section. In step S370, the next pipeline section processes the data. Then, in step S380, if the next pipeline section is the last pipeline section, the processed data is returned to the host application in step S390. However, if the next pipeline section is not the last pipeline section, the data is returned to a new next pipeline section and the data element is processed, as shown by the loop back to step S360. This "looping" continues until the last pipeline section is reached and the data is returned to the host application in step S390. The control routine then returns to step S60.

In a second embodiment of the data processing pipeline of this invention, a forward link, either replacing or in addition to the previously defined backward link is provided. In this case, after the backward link from the current downstream-most instantiation of one of the task of the task library is defined, a forward link from the immediately upstream task to the downstream-most task is defined. Alternately, only a forward link need be provided. However, in this case, the pipeline sections are initialized from the host application upstream towards the data source of data, it it exists, and are invoked from the data source downstream to the host application.

In a further embodiment, rather than providing a single forward link or a single backward link between tasks, when each task has two or more data processing channels, the channels themselves are linked together by the forward and/or backward links. In this case, each channel could be backward or forward linked to any other corresponding channel of any one of the instantiations of the tasks from the task library. Thus, one of the channels of a first pipeline section is linked to the corresponding channel of a second pipeline section, while another channel of the first pipeline section is linked to the corresponding channel of a third pipeline section.

In yet another embodiment of the present invention, special "fan-in" and "fan-out" pipeline sections are provided. In these pipeline sections, two or more upstream pipeline sections are linked to a single downstream pipeline section using a fan-in branching pipeline section. Similarly, a single upstream pipeline section is connected two or more downstream pipeline sections using a fan-out branching pipeline section.

In an application of this system, as shown in FIGS. 11–14, a system is created to emulate a stream-oriented UNIX® pipeline which very efficiently processes an image on a scanline-by-scanline basis. The UNIX® pipeline has a number of advantages, including modularity and easy maintenance, which must be maintained. However, the UNIX® pipeline has a number of disadvantages, including requiring a multi-processing processor, lack of portability, lack of an ability to dynamically reconfigure itself, and the need for system overhead in task scheduling and data flow handling.

In the image processing pipeline of this invention, the image is divided into two major parts, a header and an image body. The header defines the state of the image, such as the color space it is represented in, its orientation, and its dimensions, such as the length of a scanline, the number of scan lines, the interlace factor, the pitch or the like. The image body comprises the actual scanline data, in raster output scanner form or the like, where each scanline is one data element for the pipeline. In the image processing pipeline using this invention, the same image structure is used as the data block.

The pipeline sections therefore each contain at least three channels. The first channel is used to process the header information. The second channel is used to process the image body as the data block, on a scanline-by-scanline basis. One or more second channel-type channels can be provided, depending upon the type of image processing provided by the pipeline. The third channel is used to perform any required clean-up activities and to release the memory allocated to the data structure comprising the pipeline sections once the image has been fully processed. Essentially, since the image processing is complete by the time this third channel is invoked, the only data flowing through the channel is error handling information. In effect, the third channel causes each upstream pipeline section to return any error codes resulting from the image processing, and once this information is returned, to cause the receiving downstream pipeline section to dynamically delete the upstream pipeline section. In addition, any necessary external port procedure pointers are included in the data structure of the pipeline sections of this image processing pipeline.

That is, in the image processing system shown in FIGS. 11–14, the generalized task means 68 of FIG. 16 comprises a first channel means 84a as a header channel, a second channel means 84b as an image processing channel and a third channel means 84c as an end channel.

As described above, when the host application determines that processed image data is needed, an image processing pipeline is created. The pipeline is created by initializing various library functions from the function library 10. These functions include "invert", which inverts the colors of the image; "colorize" which colorizes a black and white image; filter, which does a convolution filter to, for example, soften the edges within the image; "enlarge" which enlarges the image body; and "reduce", which reduces the image body. This list is merely illustrative and is not intended to be exhaustive. For example "invert" will change black pixels to white pixels, and vice-versa. In addition, invert will change color pixels, for example, from red to cyan, green to magenta and blue to yellow.

The initial pipeline is formed by providing a first pipeline section, which obtains the image from, for example, a 3-color photodiode scanner and various other pipeline sections connected to a host application. The host application, for example prepares the scanned image for printing on a 4-color tandem printer. Then, the pipeline is invoked by the host application to input the header from the scanner. The request for the header travels up channel 1 of the pipeline, until the first pipeline section. The first pipeline section obtains the header from the scanner and returns it down channel 1.

As each pipeline section receives the header, it checks the header to ensure that it can correctly process the image body, alters the header to reflect what this pipeline section will do to the image body, and then returns it downstream. However, if a pipeline section determines that the image cannot be properly processed, this pipeline section dynamically reconfigures the pipeline to correct the fault.

For example, as described above, the image received from the scanner is a 3-color image. However, if for example the pipeline was originally set up assuming the 3-color scanner and 3-color printer use the same color-space in generating the image, an error will occur if the scanner and printer in fact use different color spaces. In this case, the potential error is discovered when processing the header. The pipeline section 40x which detected the error automatically reconfigures the pipeline by initializing and adding a new pipeline section 40y immediately upstream of itself. At the same time, this pipeline section 40x alters the links to reflect the position of the new pipeline section 40y. The header is then rerun. Now, after the pipeline section 40y alters the header to reflect that it changes the color space of the image, the pipeline section 40x will determine that it can correctly process the image body.

Once the header is completely processed and returned to the host application, the host application repeatedly invokes the pipeline to input the image body. From the header, the host application will also know how many scanlines are in the image body, so that it will know how may invoking cycles it will take to input and process the entire image body.

Figure 12:
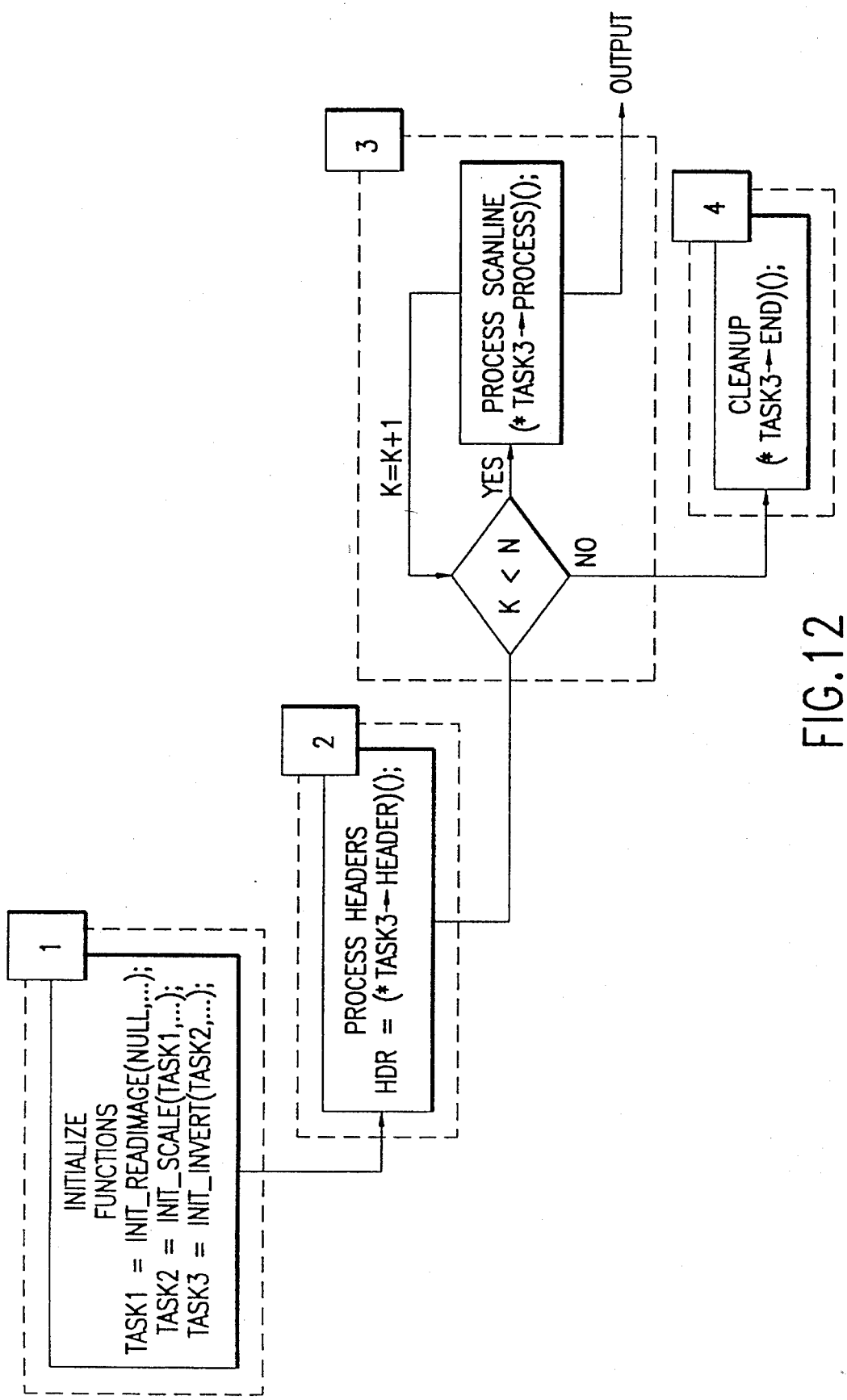
FIG. 12 shows a flow chart for forming and running the pipeline of FIG. 11.

As the pipeline is repeatedly invoked, one scanline of the image body is obtained, processed and returned to the host application as a data element for each invocation. In all other respects, the pipeline works as described above in general. Once the entire image body is obtained, processed and returned to the host application, the host application invokes the third channel to shut down the pipeline. FIG. 12 shows a flow chart illustrating the execution of this pipeline.

Figure 13:
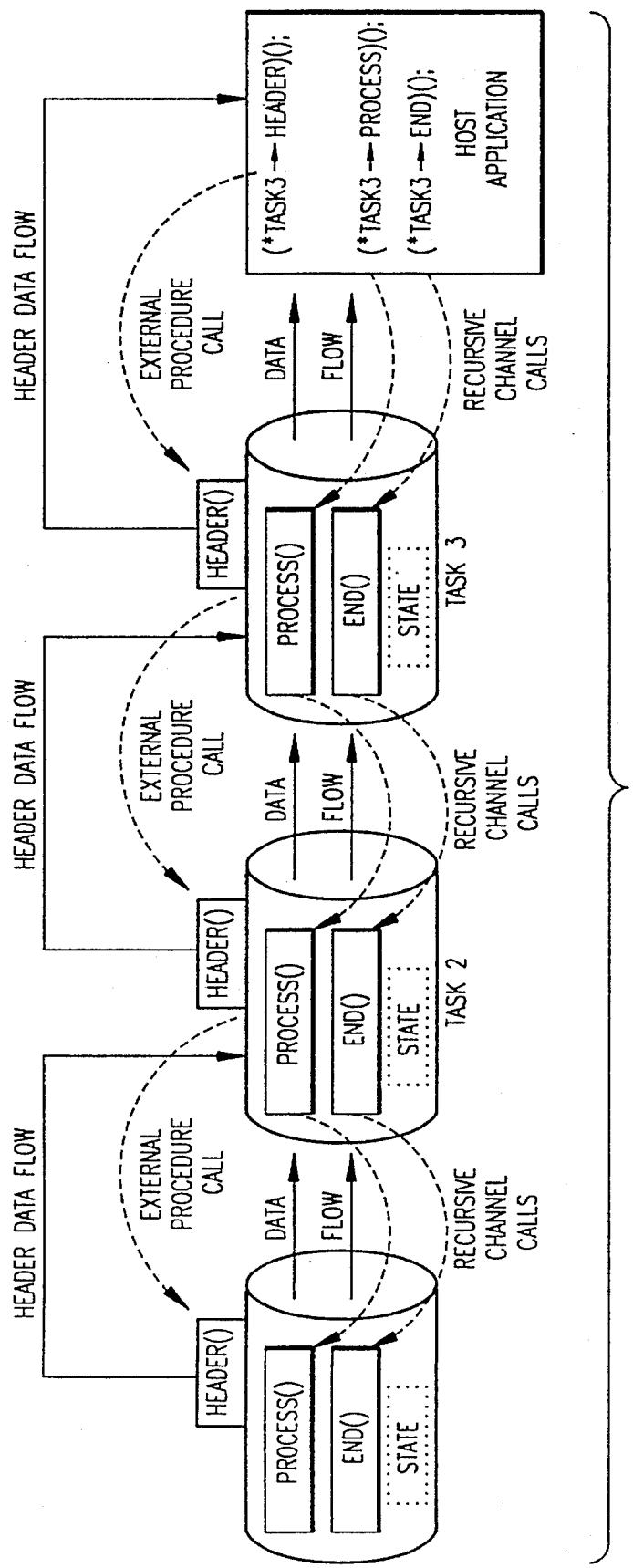
FIG. 13 shows a second embodiment of the image processing pipeline of FIG. 11.
Figure 14:
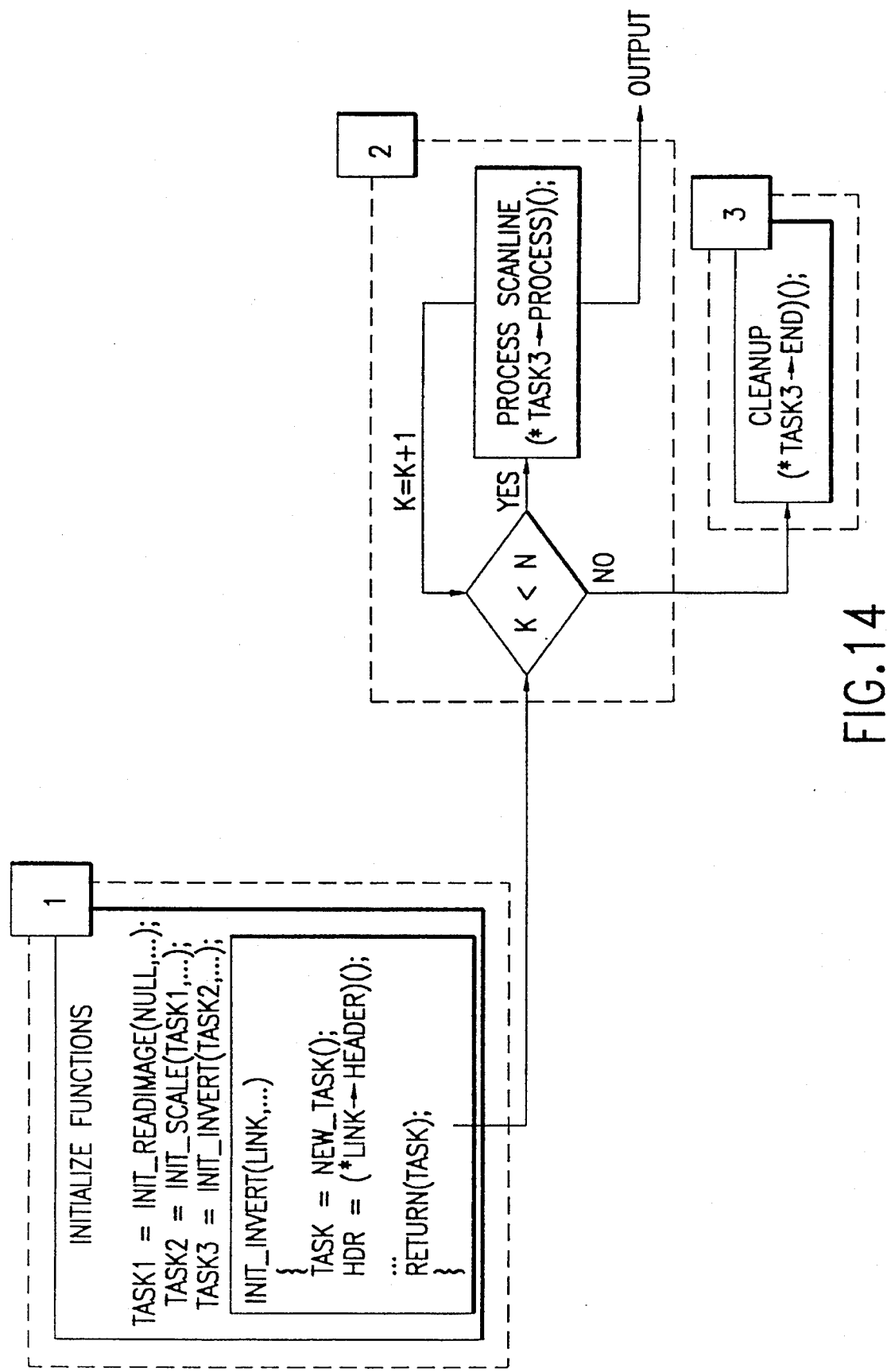
FIG. 14 shows a flow chart for forming and running the second embodiment image processing pipeline of FIG. 13.

In another embodiment of this image processing pipeline, as shown in FIG. 13, only the second and third channels are initialized and invoked. In this case, rather than the first or header channel, external ports and external procedures are used to analyze the header. This external procedure is used to obtain, process and output the header during initialization. That is, the first pipeline section obtains the header when it is initialized. Then, as each downstream pipeline section is initialized, the header is output to that pipeline section through an external procedure using the external ports. FIG. 14 shows a flow chart illustrating the execution of the pipeline of this embodiment.

While this invention has been described in conjunction with a specific apparatus, it is evident that many alternatives, modifications and variations will be apparent to those skilled in the art. Accordingly, it is intended to embrace all such alternatives, modifications and variations as fall within the spirit and broad scope of the appended claims.

What is claimed is:

1. A method for pipelined data processing of a data item in a single tasking environment, the data item comprising a header and at least one data set, the method comprising the steps of:

running a host application on a processor;

instantiating a plurality of data processing tasks to form a pipeline of linked tasks, each data processing task being an instantiation of a library function, each data processing task controlling the processor to perform data processing, each data processing task comprising:
a header channel;
at least one data processing channel, and
at least one link to at least one of another data processing task and the host application; and invoking the pipeline with the host application to cause the data processing tasks to process the at least one data set of the data item based on the header of the data item.

2. The method of claim 1, wherein the data to be processed by the pipeline is a data item, the data item comprising a header and at least one data set, and wherein the step of invoking comprises the steps of:

(a) requesting a processed data item from the pipeline with the host application;

(b) obtaining or generating the header of the data item and returning the header to the host application through the header channel;

(c) requesting a processed data set from the pipeline with the host application;

(d) obtaining or generating a data set;

(e) processing the data set with the plurality of data processing tasks and returning the processed data set to the host application through the at least one data processing channel; and (f) repeating steps (c)–(e) a plurality of times based on the header until all the data sets of the data item have been processed and returned to the host application.

3. A method for pipelined data processing of a data item in a single tasking environment, the data item comprising a header and at least one data set, the method comprising the steps of:
(a) storing a plurality of data processing functions in a library memory;
(b) storing a host application in a first block of RAM memory;
(c) operating a processor in response to the host application;
(d) instantiating one of the plurality of data processing functions as a task;
(e) storing the instantiated task in at least one additional block of RAM memory, the task comprising:
   a first data buffer as a header channel,
   at least one second data buffer, each second data buffer being a data processing channel,
   at least one third data buffer storing at least one procedure pointer as a link; and
   a fourth data buffer storing a current state of the task;
(f) repeating steps (d) and (e) at least one additional time to form a data processing pipeline comprising a plurality of linked tasks, the plurality of linked tasks including an upstream-most task, at least one intermediate task, and a downstream-most task; and
(g) obtaining a processed data item from the pipeline by operating the processor in response to the pipeline and the host application so that the data processing tasks process the at least one data set of the data item based on the header of the data item.

4. The method of claim 3, wherein the steps of providing a processed data set to an adjacent downstream task each comprises copying data stored in one of the at least one second data buffers of a task to a corresponding second data buffer of an adjacent downstream task.

5. The method of claim 4, wherein the data item comprises an image, and the at least one data set comprises at least one scanline of image data, and wherein each iteration of steps (h)–(m) comprises obtaining one scanline of image data, each scanline of image data being provided to the host application through the at least one second data buffers of the plurality of linked tasks of the pipeline.

6. The method of claim 5, wherein each task further comprises a fifth data buffer as an end channel, and wherein the steps of returning a set of accumulated error codes to an adjacent downstream task each comprises copying an accumulated set of error codes stored in the fifth data buffer of a task to the fifth data buffer of an adjacent downstream task.

7. The method of claim 6, wherein the deleting steps each comprises de-allocating the at least one additional block of RAM memory corresponding to the task being deleted.

8. A pipelined data processing system for processing a data item, the data item comprising a header and at least one data set, the system comprising:
library means for storing data processing functions;
a memory comprising a plurality of blocks of memory;
memory management means for allocating and deallocating blocks of the memory;
a processor;
host application means for operating the processor, the host application means being stored in at least one block of memory; and
a data processing pipeline comprising a plurality of linked data processing tasks, wherein the plurality of linked data processing tasks process the at least one data set of the data item based on the header of the data item, each of the plurality of data processing tasks being stored in at least one block of the memory;
wherein the host application means comprises:
   instantiating means for instantiating the data processing functions to form the pipeline of data processing tasks,
   invoking means for invoking the data processing pipeline, and
   data processing means for processing data obtained from the data processing pipeline;
wherein each one of the plurality of data processing tasks comprises:
   link means for linking the data processing task to at least one of another data processing task and the host application means,
   first channel means for passing the header of a data item between at least one of a pair of linked data processing tasks and a data processing task and the host application means,
   at least one second channel means for passing the at least one data set of a data item between at least one of a pair of linked data processing tasks, and a data processing task and the host application means,
   data processing means for processing a data item, and
   task state means for controlling the state of the data processing task.

9. The system of claim 8, wherein at least one of the plurality of data processing tasks further comprises:
data analyzing means for determining whether data sets obtained through the at least one second channel means can be processed by the data processing means of the data processing task.

10. The system of claim 9, wherein at least one of the plurality of data processing tasks further comprises reconfiguring means for reconfiguring the pipeline upon a negative determination by the data analyzing means.

11. The system of claim 8, wherein one of the plurality of data processing tasks of the pipeline comprises an upstream-most task, and wherein the upstream-most task of the pipeline further comprises data obtaining means for obtaining a data item from a data source.

12. The system of claim 11, wherein each of the plurality of data processing tasks further comprises an external port means for providing access into the data processing task.

13. A method for pipelined data processing of a data item, the data item comprising a header and at least one data set, comprising the steps of:
operating a processor with a single tasking host application;
creating a data processing pipeline of data processing tasks; and
obtaining processed data items from the data processing pipeline, wherein the creating step comprises the steps of:
instantiating one of a plurality of predefined data processing functions as a data processing task of the data processing pipeline; and
repeating the instantiating step for each desired data processing task; and
wherein the obtaining step comprises:
passing a request for a header of a data item in an upstream direction of the pipeline;
obtaining the header from a data source;
returning the requested header in a downstream direction of the pipeline, each task of the pipeline analyzing and processing the header based on a data processing function of the task;
returning the processed header to the host application; and repeatedly invoking the pipeline based on a number of data sets of the data item obtained from the header;

wherein the invoking step comprises:
passing a request for a data set in the upstream direction of the pipeline,
obtaining a data set from the data source,
returning the requested data set in the downstream direction of the pipeline, each task analyzing and processing the data set, and
returning the processed data set to the host application.

14. A method for simulating multi-tasking pipeline data processing in a single-tasking environment, comprising the steps of:

running a single-tasking host application;
creating a data processing pipeline to supply the host application with processed data from a data source;
repeatedly invoking the pipeline; and
deleting the pipeline;

wherein the step of creating the data processing pipeline comprises the steps of:
(a) instantiating a data processing function selected from a plurality of predefined data processing functions as a first data processing task;
(b) defining a link from the host application to the first data processing task;
(c) instantiating a data processing function selected from the plurality of predetermined data processing functions as an additional data processing task;
(d) defining a link from the previously instantiated data processing task to the additional data processing task and redefining the link from the host to the additional data processing task;
(e) repeating steps (c) and (d) for subsequent data processing tasks, the host application being linked to a last data processing task, each data processing task being a data structure in a memory, the data structure controlling the processor;

and wherein the step of invoking the data processing pipeline comprises the steps of
(f) requesting a header from the last data processing task, each data processing task in turn requesting the header from the data processing task to which it is linked;
(g) obtaining the header from a data source by the first data processing task;
(h) returning the header to the requesting data processing task;
(i) processing the returned header;
(j) repeating steps (h) and (i) until the header is returned to the host application; and wherein steps (f)–(j) are repeated for a plurality of data sets of the data item until all the data sets of the data item have been obtained, processed and returned to the host application.

15. The method of claim 2, wherein the step of returning the header to the host application comprises returning the header to the host application through a header external procedure port of each task of the pipeline.

16. The method of claim 3, wherein a single data processing task comprises both an intermediate task and at least one of the downstream-most data processing task and the upstream-most data processing task so that the data processing pipeline comprises two tasks.

17. The method of claim 3, wherein the step of obtaining a processed data item from the pipeline comprises the steps of:

(h) requesting a header of a data item from the downstream-most task with the host application;
(i) the downstream-most task of the pipeline requesting a header of the data item from an adjacent upstream task;
(j) each at least one intermediate task of the pipeline, in turn, requesting the header of the data item from an adjacent upstream task until the request for the header reaches the upstream-most task;
(k) obtaining or generating the header of the data item;
(l) providing the obtained or generated header to an adjacent downstream task with the upstream-most task of the pipeline;
(m) each at least one intermediate task, in turn, processing the header and providing the processed header to an adjacent downstream task until the header reaches the downstream-most task of the pipeline; and
(n) providing the processed header to the host application with the downstream-most task of the pipeline.

18. The method of claim 3, wherein the step of obtaining a processed data item from the pipeline comprises the steps of:

(h) calling a header external procedure of the downstream-most task with the host application;
(i) the downstream-most task of the pipeline calling a header external procedure of an adjacent upstream task;
(j) each at least one intermediate task of the pipeline, in turn, calling a header external procedure of an adjacent upstream task of the pipeline until the header external procedure of the upstream-most task is called;
(k) obtaining or generating a header of a data item;
(l) providing the obtained or generated header to an adjacent downstream task with the upstream-most task of the pipeline;
(m) each at least one intermediate task of the pipeline, in turn, processing the header and providing the processed header to an adjacent downstream task until the processed header reaches the downstream-most task of the pipeline; and
(n) providing the processed header to the host application with the downstream-most task of the pipeline.

19. The method of claim 3, wherein the obtaining step comprises the steps of:

(h) controlling the processor with the host application to perform the steps of:
requesting a data set from the downstream-most task of the pipeline with the host application, and
turning control of the processor over to the downstream-most task of the pipeline;
(i) the downstream-most task of the pipeline controlling the processor to perform the steps of:
requesting a data set from an adjacent upstream task of the pipeline, and
turning control of the processor over to the adjacent upstream task;
(j) each at least one intermediate task of the pipeline, in turn, controlling the processor to perform the steps of:
requesting a data set from an adjacent upstream task of the pipeline, and
turning control of the processor over to the adjacent upstream task until the request for a data set reaches the upstream-most task of the pipeline;
(k) controlling the processor with the upstream-most task of the pipeline to perform the steps of:
obtaining or generating a data set, providing the obtained or generated data set to an adjacent downstream task of the pipeline, and turning control of the processor over to the adjacent downstream task of the pipeline;

(l) each at least one intermediate task of the pipeline, in turn, controlling the processor to perform the steps of:

processing the data set received from an adjacent upstream task of the pipeline, providing the processed data set to an adjacent downstream task of the pipeline, and turning control of the processor over to the adjacent downstream task of the pipeline until the processed data set is provided to the downstream-most task of the pipeline;

(m) controlling the processor with the downstream-most task of the pipeline to perform the steps of:

providing the processed data set to the host application, and turning control of the processor over to the host application; and (n) repeating steps (h)–(m) until all the data sets of the data item have been processed and provided to the host application.

20. The method of claim 3, further comprising the step of:

(h) deleting the pipeline from RAM memory.

21. The method of claim 20, wherein the deleting step comprises the steps of:

(i) requesting error codes from the downstream-most task of the pipeline with the host application;

(j) the downstream-most task of the pipeline requesting the error codes from an adjacent upstream task;

(k) each at least one intermediate task of the pipeline, in turn, requesting the error codes from an adjacent upstream task until the request for error codes reaches the upstream-most task of the pipeline;

(l) returning any error codes associated with the upstream-most task to an adjacent downstream task;

(m) each of the at least one intermediate tasks of the pipeline, in turn, performing the steps of:

deleting an adjacent upstream task, appending any error codes associated with the at least one intermediate task to the error codes received from an adjacent upstream task to create a set of accumulated error codes, and returning the set of accumulated error codes to an adjacent downstream task, until the set of accumulated error codes are returned to the downstream-most task of the pipeline;

(n) returning the set of accumulated error codes to the host application with the downstream-most task of the pipeline; and (o) deleting the downstream-most task of the pipeline.

22. The system of claim 8, wherein each task further comprises error code generating means for generating error codes.

23. The system of claim 22, wherein each task further comprises third channel means for passing generated error codes between at least one of a pair of linked data processing tasks and a data processing task and the host application means.

24. The system of claim 10, wherein the reconfiguring means comprises:

reconfiguration instantiating means for instantiating a data processing function to form at least one additional data processing task; and link altering means for creating and altering links between the data processing tasks of the pipeline so that the at least one additional data processing task is linked to at least one of another data processing task of the data processing pipeline and the host application means and so that at least one of another data processing task and the host application is linked to the at least one additional data processing task.

25. A method for pipelined data processing of a data item in a single tasking computer environment, the data item comprising a header and at least one data set, the method comprising the steps of:

operating a processor with a host application;

creating a data processing pipeline comprising a plurality of linked data processing tasks stored in blocks of memory;

processing the at least one data set of the data item with the data processing tasks of the data processing pipeline based on the header of the data item and providing the at least one processed data set to the host application after the pipeline has been created;

wherein the data processing tasks of the data processing pipeline each control the processor to perform data processing.

26. The method of claim 25, wherein the step of creating a data processing pipeline comprises the steps of:

instantiating a predefined data processing function to create an upstream-most data processing task of the pipeline; and instantiating a predefined data processing function to create at least one additional data processing task of the pipeline, the at least one additional data processing task being linked to one of another data processing task in the pipeline and the host application;

wherein the last instantiated data processing task is a downstream-most data processing task, and wherein data processing tasks instantiated after the upstream-most data processing task, and before the downstream-most data processing task are intermediate data processing tasks.

27. The method of claim 26, further comprising the step of initializing the data processing tasks of the pipeline after the pipeline has been created, the initializing step comprising the steps of:

obtaining or generating the header of a data item;

initializing each of the data processing tasks of the pipeline based on the header; and providing the header to the host application.

28. The method of claim 27, wherein the initializing step further comprises:

processing the header with each of the data processing tasks of the pipeline so that the header reflects the data processing that will be performed by each of the data processing tasks of the pipeline; and providing the processed header to the host application.

29. The method of claim 25, wherein the step of processing the at least one data set and providing the processed at least one data set to the host application comprises the steps of:

(a) requesting a data set from the pipeline with the host application;

(b) obtaining or generating a data set;

(c) processing the data set with the tasks of the data processing pipeline based on the header of the data item;

(d) providing the processed data set to the host application; and (e) repeating steps (a)–(d) until all data sets of a data item have been obtained, processed, and provided to the host application.

30. The method of claim 25, further comprising the steps of:

accumulating all error codes generated by the tasks of the pipeline;

providing the accumulated error codes to the host application; and deleting the data processing tasks from the blocks of memory to delete the data processing pipeline.

31. A pipelined data processing system for pipelined data processing of a data item, the data item comprising a header and at least one data set, the system comprising:

a processor;

a memory comprised of a plurality of blocks of memory;

a host application for controlling the processor; and a data processing pipeline for processing a data item and providing the processed data item to the host application, the data processing pipeline comprising a plurality of linked data processing tasks, each of the data processing tasks being stored in at least one block of memory and controlling the processor to perform data processing, wherein each one of the plurality of data processing tasks comprises:

link means for linking the data processing task to one of another data processing task of the pipeline and the host application, header channel means for passing a header of a data item between the data processing task and at least one of another data processing task of the pipeline, and the host application, data processing means for controlling the processor to perform data processing of a data set of a data item based on at least the header of the data item, and data channel means for passing a data set between the data processing task and at least one of another data processing task of the pipeline, and the host application.

32. The data processing system of claim 31, wherein the header channel means of each data processing task comprises a header external procedure port.

33. The data processing system of claim 31, wherein each of the plurality of data processing tasks further comprises:

error code generating means for generating error codes; and end channel means for passing generated error codes between the data processing task and at least one of another data processing task of the pipeline and the host application.

34. The data processing system of claim 31, wherein at least one of the plurality of data processing tasks further comprises:

data analyzing means for determining if the data processing task is capable of processing data sets that are to be provided to the data processing task; and reconfiguring means for instantiating at least one additional data processing task and for creating and altering links of the data processing tasks of the pipeline to link the at least one additional data processing task to at least one of another data processing task of the pipeline and the host application and for linking at least one of another data processing task of the pipeline and the host application to the at least one additional data processing task.

35. The data processing system of claim 31, wherein the host application comprises:

instantiation means for instantiating predefined data processing functions to create the plurality of linked data processing tasks of the pipeline; and invoking means for invoking the data processing pipeline to obtain a processed data item from the data processing pipeline.

* * * * *